United States Patent
Chen et al.

(10) Patent No.: US 12,199,276 B2
(45) Date of Patent: *Jan. 14, 2025

(54) SECONDARY BATTERY, BATTERY MODULE, BATTERY PACK, AND ELECTRICAL APPARATUS

(71) Applicant: CONTEMPORARY AMPEREX TECHNOLOGY (HONG KONG) LIMITED, Hong Kong (CN)

(72) Inventors: Peipei Chen, Ningde (CN); Limei Zhang, Ningde (CN); Yao Jiang, Ningde (CN); Jiao Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/736,548

(22) Filed: Jun. 7, 2024

(65) Prior Publication Data
US 2024/0322141 A1 Sep. 26, 2024

Related U.S. Application Data

(63) Continuation of application No. PCT/CN2022/084884, filed on Apr. 1, 2022.

(51) Int. Cl.
| | | |
|---|---|---|
| *H01M 4/36* | (2006.01) | |
| *H01M 4/02* | (2006.01) | |
| *H01M 4/505* | (2010.01) | |
| *H01M 4/58* | (2010.01) | |

(Continued)

(52) U.S. Cl.
CPC ........... *H01M 4/366* (2013.01); *H01M 4/505* (2013.01); *H01M 4/5825* (2013.01); *H01M 4/583* (2013.01); *H01M 10/0567* (2013.01); *H01M 2004/021* (2013.01); *H01M 2004/028* (2013.01); *H01M 2300/0025* (2013.01)

(58) Field of Classification Search
None
See application file for complete search history.

(56) References Cited

U.S. PATENT DOCUMENTS

| | | | |
|---|---|---|---|
| 11,888,150 B2* | 1/2024 | Liu | H01M 4/136 |
| 11,973,218 B2* | 4/2024 | Zhou | H01M 4/5825 |

(Continued)

FOREIGN PATENT DOCUMENTS

| | | | |
|---|---|---|---|
| CN | 105261740 A | 1/2016 | |
| CN | 106058225 A | 10/2016 | |

(Continued)

OTHER PUBLICATIONS

Machine translation of KR10-1576208 B1, published on Dec. 21, 2015 (Year: 2015).*
International Search Report received in the corresponding International Application PCT/CN2022/084884, mailed on Nov. 25, 2022.
Written Opinion of ISA received in the corresponding International Application PCT/CN2022/084884, mailed on Nov. 25, 2022.

*Primary Examiner* — Anca Eoff
(74) *Attorney, Agent, or Firm* — Kilpatrick Townsend & Stockton LLP

(57) ABSTRACT

Provided are a secondary battery, a battery module, a battery pack, and an electrical apparatus. The secondary battery comprises a positive electrode plate and a non-aqueous electrolyte solution, where the positive electrode plate comprises a positive electrode active material having a core-shell structure and comprising an inner core and a shell cladding the inner core, where the inner core has a chemical formula of $Li_{1+x}Mn_{1-y}A_yP_{1-z}R_zO_4$, a first cladding layer comprises crystalline pyrophosphates $Li_aMP_2O_7$ and/or $M_b(P_2O_7)_c$, a second cladding layer comprises a crystalline phosphate $XPO_4$, and a third cladding layer is carbon; and the non-aqueous electrolyte solution comprises a first additive comprising one or more compounds in the group consisting of a compound represented by formula 1, a compound represented by formula 2, and a compound represented by formula 3, thereby improving rate performance, cycling performance, and high-temperature stability of a lithium manganese phosphate secondary battery.

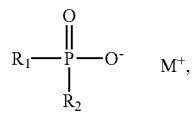

formula 1

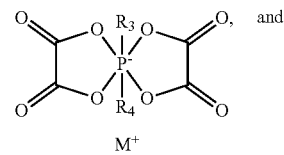

formula 2

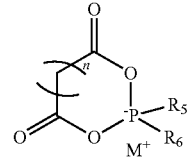

formula 3

21 Claims, 2 Drawing Sheets

(51) Int. Cl.
*H01M 4/583* (2010.01)
*H01M 10/0567* (2010.01)

(56) References Cited

U.S. PATENT DOCUMENTS

| | | | | |
|---|---|---|---|---|
| 2015/0171476 | A1* | 6/2015 | Onozaki | H01M 10/0569 |
| | | | | 429/337 |
| 2018/0166679 | A1 | 6/2018 | Ophir et al. | |
| 2023/0327091 | A1* | 10/2023 | Ma | H01M 4/5825 |
| 2023/0361284 | A1* | 11/2023 | Ji | H01M 4/366 |

FOREIGN PATENT DOCUMENTS

| | | | |
|---|---|---|---|
| CN | 108987697 A | | 12/2018 |
| CN | 110416525 A | | 11/2019 |
| CN | 114256448 A | | 3/2022 |
| KR | 101576208 B1 | * | 12/2015 |

* cited by examiner

SECONDARY BATTERY, BATTERY MODULE, BATTERY PACK, AND ELECTRICAL APPARATUS

CROSS REFERENCE TO RELATED APPLICATION

The present application is a continuation of International Application PCT/CN2022/084884, filed on Apr. 1, 2022 and entitled "SECONDARY BATTERY, BATTERY MODULE, BATTERY PACK, AND ELECTRICAL APPARATUS", which is incorporated in its entirety herein by reference.

TECHNICAL FIELD

The present application relates to the technical field of lithium batteries, and particularly relates to a secondary battery, a battery module, a battery pack, and an electrical apparatus.

BACKGROUND

In recent years, as lithium-ion batteries are increasingly widely applied in energy storage power systems, such as water, fire, wind, and solar power stations, as well as many fields, such as electric tools, electric bicycles, electric motorcycles, electric vehicles, military equipment, and aerospace. Due to great development of the lithium-ion batteries, higher requirements are put forward for energy density, cycling performance, and safety performance thereof.

Compared with other positive electrode active materials, a positive electrode active material lithium manganese phosphate has high safety and cycle life, but has a disadvantage of poor rate performance. At present, this problem is generally solved by means of, e.g., cladding or doping. However, it is still expected to further improve the rate performance, cycling performance, and high-temperature stability of the positive electrode active material lithium manganese phosphate.

SUMMARY OF THE INVENTION

In view of the above problems, an object of the present application is to provide a secondary battery, a battery module, a battery pack, and an electrical apparatus, to solve the problem of poor cycling performance of a lithium manganese phosphate secondary battery.

In order to achieve the above objective, a first aspect of the present application provides a secondary battery, comprising a positive electrode plate and a non-aqueous electrolyte solution, where the positive electrode plate comprises a positive electrode active material having a core-shell structure and comprising an inner core and a shell cladding the inner core, where the inner core has a chemical formula of $Li_{1+x}Mn_{1-y}A_yP_{1-z}R_zO_4$, where x is any value ranging from −0.100 to 0.100, y is any value ranging from 0.001 to 0.500, z is any value ranging from 0.001 to 0.100, the A is one or more elements selected from the group consisting of Zn, Al, Na, K, Mg, Mo, W, Ti, V, Zr, Fe, Ni, Co, Ga, Sn, Sb, Nb, and Ge, and is optionally one or more elements among Fe, Ti, V, Ni, Co, and Mg, the R is one or more elements selected from the group consisting of B, Si, N, and S, and optionally, the R is an element selected from B, Si, N, and S; and values of the x, y, and z satisfy a condition of: keeping the whole inner core electroneutral; the shell comprises a first cladding layer cladding the inner core, a second cladding layer cladding the first cladding layer, and a third cladding layer cladding the second cladding layer, where the first cladding layer comprises crystalline pyrophosphates $Li_aMP_2O_7$ and/or $M_b(P_2O_7)_c$, where $0 \leq a \leq 2$, $1 \leq b \leq 4$, and $1 \leq c \leq 6$, values of the a, b, and c satisfy a condition of: keeping the crystalline pyrophosphate $Li_aMP_2O_7$ or $M_b(P_2O_7)_c$ electroneutral, and M in the crystalline pyrophosphates $Li_aMP_2O_7$ and $M_b(P_2O_7)_c$ is each independently one or more elements selected from the group consisting of Fe, Ni, Mg, Co, Cu, Zn, Ti, Ag, Zr, Nb, and Al, the second cladding layer comprises a crystalline phosphate $XPO_4$, where the X is one or more elements selected from the group consisting of Li, Fe, Ni, Mg, Co, Cu, Zn, Ti, Ag, Zr, Nb, and Al, and the third cladding layer is carbon; and the non-aqueous electrolyte solution comprises a first additive comprising one or more compounds in the group consisting of a compound represented by formula 1, a compound represented by formula 2, and a compound represented by formula 3,

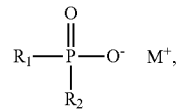

formula 1

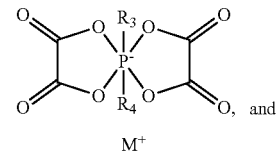

formula 2

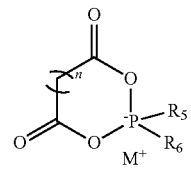

formula 3 wherein $R_1$ and $R_2$ each independently represent any one of F, C1-C6 fluoroalkyl, C1-C6 alkyl, C1-C6 alkoxy, C2-C6 alkenyl, C2-C6 alkynyl, or C6-C10 aryl, and at least one of $R_1$ or $R_2$ represents any one of F or C1-C6 fluoroalkyl;

$R_3$ and $R_4$ each independently represent any one of F, C1-C6 fluoroalkyl, C1-C6 alkyl, C1-C6 alkoxy, C2-C6 alkenyl, or C2-C6 alkynyl, and at least one of $R_3$ or $R_4$ represents any one of F or C1-C6 fluoroalkyl;

$R_5$ and $R_6$ each independently represent any one of F, C1-C6 fluoroalkyl, C1-C6 alkyl, C1-C6 alkoxy, C2-C6 alkenyl, C2-C6 alkynyl, carbonyl, $O^-$, $=O$, $-^-BF_3$, or $-O^-BF_3$;

M in each chemical formula each independently represents one of an alkali metal or an alkaline earth metal, and n is 0, 1, or 2.

Unless stated otherwise, in the above chemical formulas, when A is two or more elements, the above definition on the numerical range of y is not only a definition on a stoichiometric number of each element as A, but also a definition on a sum of the stoichiometric number of each element as A. For example, when A is two or more elements A1, A2, . . . , An, respective stoichiometric numbers y1, y2, . . . , yn of A1, A2, . . . , An are each required to fall within the numerical range defined for y in the present application, and a sum of y1, y2, . . . , yn are also required to fall within this numerical range. Similarly, in the case where R is two or more elements, the definition on the numerical range of the stoichiometric number of R in the present application also has the above meaning.

Herein, a crystalline state means that the crystallinity is 50% or higher, that is, 50%-100%. A state with a crystallinity of less than 50% is called a glassy state. The crystalline pyrophosphate and crystalline phosphate herein have a crystallinity from 50% to 100%. Pyrophosphates and phosphates with a certain crystallinity not only promote the full exertion of the ability of the pyrophosphate cladding layer to hinder the dissolution of manganese ions, the excellent ability of the phosphate cladding layer to conduct lithium ions, and the function of reducing interfacial side reactions, but also allow for better lattice matching between the pyrophosphate cladding layer and the phosphate cladding layer, thereby enabling tight bonding between the cladding layers.

The present application provides a novel positive electrode active material lithium manganese phosphate having a core-shell structure by doping element A at a position of manganese of lithium manganese phosphate and doping element R at a position of phosphorus to obtain an inner core of doped lithium manganese phosphate and three-layer cladding on a surface of the inner core sequentially, and applies the positive electrode active material in a secondary battery, thereby significantly improving the high-temperature cycling performance, cycling stability, and high-temperature storage performance of the secondary battery.

Further, a phosphate additive is introduced into the non-aqueous electrolyte solution to form $Li_xF_yPO_4$ on a surface of a pyrophosphate in a charging process of a lithium-ion battery, and improve the ion conducting ability of the pyrophosphate-cladded positive electrode active material lithium manganese phosphate, thereby further improving the capacity and rate performance of the secondary battery comprising the same.

In any embodiment, in the formula 1, the $R_1$ and $R_2$ each independently represent any one of F, C1-C3 fluoroalkyl, C1-C3 alkyl, C1-C3 alkoxy, C2-C3 alkenyl, C2-C3 alkynyl, phenyl, benzyl, or methylphenyl, at least one of $R_1$ or $R_2$ represents any one of F or C1-C3 fluoroalkyl, optionally, $R_1$ and $R_2$ each independently represent any one of F, C1-C3 alkyl, or C1-C3 fluoroalkyl, optionally, the C1-C3 fluoroalkyl is —$CF_3$, —$C_2F_5$, —$CH_2CF_3$, or —$CF_2CH_3$, and the C1-C3 alkyl is methyl or ethyl.

In any embodiment, in the formula 2, $R_3$ and $R_4$ each independently represent any one of F, C1-C3 fluoroalkyl, C1-C3 alkyl, C1-C3 alkoxy, C2-C3 alkenyl, or C2-C3 alkynyl, at least one of $R_3$ or $R_4$ represents any one of F or C1-C3 fluoroalkyl, and optionally, $R_3$ and $R_4$ each independently represent any one of F or C1-C3 fluoroalkyl.

In any embodiment, in the formula 3, $R_5$ and $R_6$ each independently represent any one of F, C1-C3 fluoroalkyl, C1-C3 alkyl, C1-C3 alkoxy, C2-C6 alkenyl, C2-C6 alkynyl, carbonyl, O—, =O, —$^-BF_3$, or —$O^-BF_3$, optionally, the $R_5$ and $R_6$ each independently represent any one of F, fluoromethyl, methyl, $O^-$, =O, —$^-BF_3$, or —$O^-BF_3$, and n is 0 or 1.

In any embodiment, M in each chemical formula each independently represents one of Li, Na, or K.

Optionally, the first additive used in the present application may be arbitrarily selected from the above chemical formulas, and in some embodiments, the first additive includes one or more of compounds of:

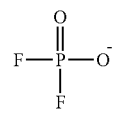 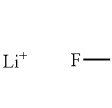 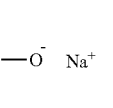

-continued

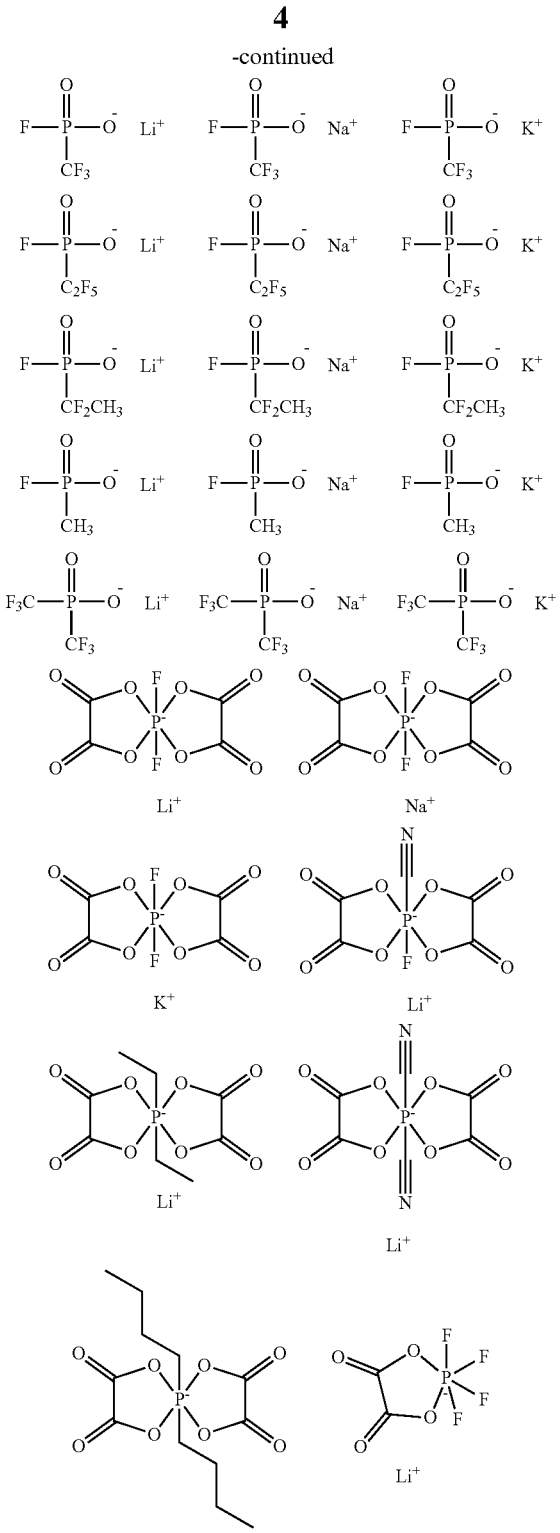

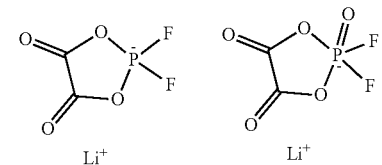

-continued

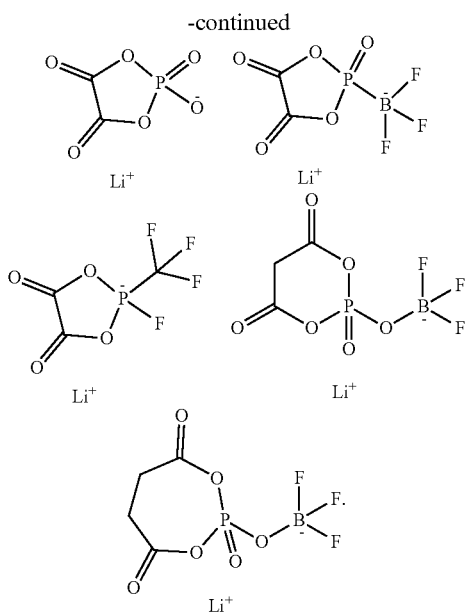

In some embodiments, the first additive includes any one or more compounds of:

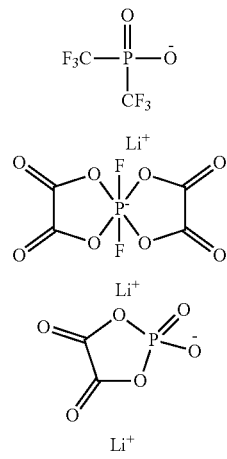

The first additives efficiently form $Li_xF_yPO_4$ in the charging process, thereby more efficiently improving the ion conducting ability of the positive electrode active material in the present application.

In some embodiments, the non-aqueous electrolyte solution further comprises a second additive comprising one or more compounds in the group consisting of an unsaturated bond-containing cyclic carbonate compound, a halogen-substituted cyclic carbonate compound, a sulfate compound, a sulfite compound, a sultone compound, a disulfonic acid compound, a nitrile compound, an aromatic compound, an isocyanate compound, a phosphazene compound, a cyclic anhydride compound, a phosphite compound, a phosphate compound, or a borate compound. The second additive can improve the capacity and cycling performance of the secondary battery according to its own performance, and those skilled in the art can choose a corresponding second additive according to actual requirements.

In some embodiments, based on a total weight of the non-aqueous electrolyte solution, a content of the first additive is WI wt %, where WI is from 0.005 to 20 (e.g., 0.005, 0.01, 0.05, 0.1, 0.2, 0.3, 0.4, 0.5, 1, 2, 3, 4, 5, 8, 10, 12, 15, 18, or 20), and is optionally from 0.1 to 5, and/or a content of the second additive is W2 wt %, where W2 is from 0.001 to 20, and is optionally from 0.01 to 10. The first additive at the above content not only avoids impedance increase of positive and negative electrodes caused by excessive first additive, but also ensures large capacity and high rate performance of the secondary battery. Therefore, a mass ratio of the first additive in the non-aqueous electrolyte solution in the above range can significantly improve the ion conducting ability of the positive electrode active material in the present application without deteriorating impedance of the positive and negative electrodes, thereby further improving the capacity and rate performance of the secondary battery.

In some embodiments, the W1/W2 is defined as M, where M is from 0.001 to 50, and is optionally from 0.05 to 20. When the W2/W1 is in the above range, the two can play a better synergistic role, thereby further improving the capacity and cycling performance.

In some embodiments, the non-aqueous electrolyte solution further comprises an organic solvent, a type of which is not particularly limited, and which may be selected according to actual requirements. Optionally, the organic solvent includes one or more of a cyclic carbonate compound, a chain carbonate compound, or a carboxylate compound, and further includes one or more compounds in the group consisting of dimethyl carbonate, diethyl carbonate, dipropyl carbonate, ethyl methyl carbonate, methyl propyl carbonate, ethyl propyl carbonate, ethylene carbonate, propylene carbonate, butylene carbonate, γ-butyrolactone, methyl formate, ethyl formate, methyl acetate, ethyl acetate, propyl acetate, methyl propionate, ethyl propionate, butyl propionate, or tetrahydrofuran.

In some embodiments, the non-aqueous electrolyte solution further comprises an electrolyte salt. Optionally, the electrolyte salt comprises one or more compounds in the group consisting of $LiN(C_xF_{2x+1}SO_2)(C_yF_{2y+1}SO_2)$, $Li(FSO_2)_2N$, $LiCF_3SO_3$, $LiPF_6$, $LiBF_4$, $LiAsF_6$, $LiClO_4$, LiBOB, LiDFOB, or LiTFOP, x and y represent positive integers, optionally, x and y are each independently 0, 1, 2, or 3, and a concentration of the electrolyte salt in the non-aqueous electrolyte solution ranges from 0.5 M to 2.5 M, and optionally ranges from 0.8 M to 2 M, thereby ensuring stable and fast migration of $Li^+$ between the positive and negative electrodes.

In some embodiments, based on a weight of the inner core, a cladding amount of the first cladding layer is C1 wt %, where C1 is greater than 0 and less than or equal to 6, is optionally greater than 0 and less than or equal to 5.5, and is more optionally greater than 0 and less than or equal to 2. And/or, based on the weight of the inner core, a cladding amount of the second cladding layer is C2 wt %, where C2 is greater than 0 and less than or equal to 6, is optionally greater than 0 and less than or equal to 5.5, and is more optionally from 2 to 4. And/or, based on the weight of the inner core, a cladding amount of the third cladding layer is C3 wt %, where C3 is greater than 0 and less than or equal to 6, is optionally greater than 0 and less than or equal to 5.5, and is more optionally greater than 0 and less than or equal to 2.

In the positive electrode active material having the core-shell structure in the above embodiments, the cladding amounts of the three cladding layers are preferably within the above ranges, thereby fully cladding the inner core, and further improving the kinetic performance and safety performance of the secondary battery without sacrificing the gram capacity of the positive electrode active material.

In some embodiments, a ratio of (W1+W2)/(C1+C2+C3) is defined as Q, where Q is from 0.001 to 2 (e.g., 0.001, 0.002, 0.005, 0.01, 0.02, 0.05, 0.08, 0.1, 0.5, 0.8, 1, or 2), and is optionally from 0.01 to 1. The Q value is controlled within the above range, thereby avoiding that, when the Q value is less than the above range, the lithium salt or additives are not enough to reduce acidity of the electrolyte solution, the dissolution of manganese ions fails to be fully and completely inhibited, and the improvement degree of high-temperature cycling performance and storage performance is insufficient; while when the Q value is greater than the above range, the film forming impedance is too large, thereby affecting the improvement of the capacity and rate performance of the lithium-ion battery.

In any embodiment, an interplanar spacing of the crystalline pyrophosphate in the first cladding layer ranges from 0.293 to 0.470 nm, and an angle in a crystallographic direction (111) ranges from 18.000 to 32.00°; and an interplanar spacing of the crystalline pyrophosphate in the second cladding layer ranges from 0.244 to 0.425 nm, and an angle in the crystallographic direction (111) ranges from 20.000 to 37.00°. A crystalline substance is used in both the first cladding layer and the second cladding layer of the positive electrode active material in the above embodiments, with interplanar spacing and angle ranges thereof falling within the above ranges, thereby effectively avoiding impurity phases in the cladding layer, and improving the gram capacity, cycling performance, and rate performance of the material.

In any embodiment, in the inner core, a ratio of y to 1−y is from 1:10 to 1:1, and is optionally from 1:4 to 1:1, thereby further improving the cycling performance and rate performance of the secondary battery.

In any embodiment, in the inner core, a ratio of z to 1−z is from 1:999 to 1:9, and is optionally from 1:499 to 1:249, thereby further improving the cycling performance and rate performance of the secondary battery.

In any embodiment, carbon of the third cladding layer is a mixture of SP2 hybridized carbon and SP3 hybridized carbon, and optionally, a molar ratio of the SP2 hybridized carbon to the SP3 hybridized carbon is any value ranging from 0.1 to 10, and is optionally any value ranging from 2.0 to 3.0. In the above embodiments, the molar ratio of the SP2 hybridized carbon to the SP3 hybridized carbon is limited to the above range, thereby improving the comprehensive performance of the secondary battery.

In any embodiment, a thickness of the first cladding layer is from 1 to 10 nm; and/or a thickness of the second cladding layer is from 2 to 15 nm; and/or a thickness of the third cladding layer is from 2 to 25 nm.

In the above embodiments, when the thickness of the first cladding layer ranges from 1 to 10 nm, not only can potential adverse effects of too large thickness on the kinetic performance of the material be avoided, but also the problem of too small thickness failing to hinder the migration of transition metal ions can be avoided. When a thickness of the second cladding layer ranges from 2 and 15 nm, the surface structure of the second cladding layer is stable with less side reactions with the electrolyte solution, thereby effectively reducing interfacial side reactions, and improving the high-temperature performance of the secondary battery. When a thickness of the third cladding layer ranges from 2 to 20 nm, the conductivity of the material can be improved, and the compaction density performance of the battery electrode plate prepared using the positive electrode active material can be improved.

In any embodiment, based on a weight of the positive electrode active material having the core-shell structure, a content of element manganese ranges from 10 wt % to 35 wt %, optionally ranges from 15 wt % to 30 wt %, and more optionally ranges from 17 wt % to 20 wt %; a content of element phosphorus ranges from 12 wt % to 25 wt %, and optionally ranges from 15 wt % to 20 wt %; and a weight ratio of element manganese to element phosphorus ranges from 0.90 to 1.25, and optionally ranges from 0.95 to 1.20.

In the positive electrode active material having the core-shell structure in the above embodiments, the content of element manganese within the above range can effectively avoid problems such as structural stability decline and density decrease of the material that may be caused by a too high content of element manganese, thereby improving the cycling performance, storage performance, and compaction density performance of the secondary battery; and can avoid a problem of low voltage plateau that may be caused by a too low content of element manganese, thereby increasing the energy density of the secondary battery.

In the positive electrode active material having the core-shell structure in the above embodiments, the content of element phosphorus within the above range can effectively avoid situations that: a too high content of element phosphorus may cause too strong covalency of P—O, thereby affecting the conductivity of small polarons, and affecting the conductivity of the material; and a too low content of element phosphorus may decrease lattice structure stability of the pyrophosphate in the inner core and the first cladding layer and/or the phosphate in the second cladding layer, thereby affecting the overall stability of the material.

In the positive electrode active material having the core-shell structure in the above embodiments, a weight ratio of element manganese to element phosphorus within the above range can effectively avoid situations that: a too high weight ratio may increase the dissolution of transition metals, thereby affecting the stability of the material and the cycling performance and storage performance of the secondary battery; and a too low weight ratio may decrease the discharge voltage plateau of the material, thereby reducing the energy density of the secondary battery.

In any embodiment, a lattice change rate of the positive electrode active material having the core-shell structure is 4% or less, optionally 3.8% or less, and more optionally from 2.0 to 3.8%, before and after complete deintercalation of lithium. The positive electrode active material having the core-shell structure in the above embodiments can achieve the lattice change rate of 4% or less before and after deintercalation of lithium. Therefore, use of the positive electrode active material can improve the gram capacity and rate performance of the secondary battery.

In any embodiment, an antisite defect concentration of Li/Mn of the positive electrode active material having the core-shell structure is 4% or less, is optionally 2.2% or less, and is more optionally from 1.5 to 2.2%. The antisite defect concentration of Li/Mn within the above range can prevent $Mn^{2+}$ from hindering the transmission of $Li^+$, and further improve the gram capacity and rate performance of the positive electrode active material.

In any embodiment, a compaction density of the positive electrode active material having the core-shell structure under 3 T (ton) is 2.2 $g/cm^3$ or more, and is optionally more than 2.2 $g/cm^3$ and less than 2.8 $g/cm^3$. Therefore, when the compaction density is enhanced, weight of the active material per unit volume increases, which is more conducive to enhancing the volumetric energy density of the secondary battery.

In any embodiment, a surface oxygen valence state of the positive electrode active material having the core-shell structure is −1.90 or less, and is optionally from −1.90 to −1.98. Hence, the surface oxygen valence state of the positive electrode active material is limited to the above range as described above, thereby further reducing interfacial side reactions between the positive electrode material and the electrolyte solution, and improving the cycling performance, high-temperature storage performance and gas production of the battery cell.

A second aspect of the present application further provides a battery module, comprising a secondary battery which is any one of the above secondary batteries in the present application.

A third aspect of the present application further provides a battery pack, comprising a battery module which is any one of the above battery modules in the present application.

A fourth aspect of the present application further provides an electrical apparatus, comprising at least one of a secondary battery, a battery module, or a battery pack. The secondary battery, the battery module, and the battery pack are the secondary battery, the battery module, and the battery pack provided in the present application.

Therefore, the battery module and the battery pack in the present application have high cycling performance, high rate performance, and particularly significantly improved high-temperature stability, thereby providing high power cycle stability and high-temperature operation stability for the electrical apparatus having the secondary battery, the battery module, or the battery pack in the present application.

DESCRIPTION OF REFERENCE NUMERALS

Figure 1:
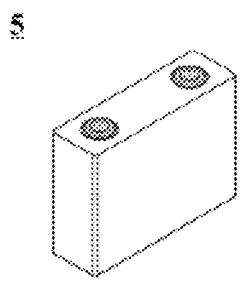
FIG. 1 is a schematic view of a secondary battery according to an embodiment of the present application.

1 battery pack; 2 upper box; 3 lower box; 4 battery module; 5 secondary battery; 51 case; 52 electrode assembly; 53 top cover assembly

DETAILED DESCRIPTION

Hereinafter, the embodiments of the secondary battery, battery module, battery pack and electrical apparatus of the present application are specifically disclosed by referring to the detailed description of the drawings as appropriate. However, there may be cases where unnecessary detailed description is omitted. For example, there are cases where detailed descriptions of well-known items and repeated descriptions of actually identical structures are omitted. This is to avoid unnecessary redundancy in the following descriptions and to facilitate understanding by those skilled in the art. In addition, the drawings and subsequent descriptions are provided for those skilled in the art to fully understand the present application, and are not intended to limit the subject matter recited in the claims.

"Ranges" disclosed in the present application are defined in the form of lower limits and upper limits, a given range is defined by the selection of a lower limit and an upper limit, and the selected lower and upper limits define boundaries of a particular range. A range defined in this manner may be inclusive or exclusive of end values, and may be arbitrarily combined, that is, any lower limit may be combined with any upper limit to form a range. For example, if the ranges of 60-120 and 80-110 are listed for a particular parameter, it is understood that the ranges of 60-110 and 80-120 are also contemplated. Additionally, if the minimum range values 1 and 2 are listed, and if the maximum range values 3, 4 and 5 are listed, the following ranges are all contemplated: 1-3, 1-4, 1-5, 2-3, 2-4 and 2-5. In the present application, unless stated otherwise, the numerical range "a-b" represents an abbreviated representation of any combination of real numbers between a to b, where both a and b are real numbers. For example, the numerical range "0-5" means that all real numbers between "0-5" have been listed herein, and "0-5" is just an abbreviated representation of the combination of these numerical values. In addition, when a parameter is expressed as an integer greater than or equal to 2, it is equivalent to disclosing that the parameter is, for example, an integer of 2, 3, 4, 5, 6, 7, 8, 9, 10, 11, 12, and the like.

Unless otherwise specified, all embodiments and optional embodiments of the present application may be combined with each other to form new technical solutions.

Unless otherwise specified, all technical features and optional technical features of the present application may be combined with each other to form new technical solutions.

Unless otherwise specified, all steps of the present application may be performed sequentially or randomly, and preferably sequentially. For example, the method includes steps (a) and (b), which means that the method may include steps (a) and (b) performed sequentially, or may include steps (b) and (a) performed sequentially. For example, the reference to the method may further comprise step (c), which means that step (c) may be added to the method in any order, for example, the method may comprise steps (a), (b) and (c), or may comprise steps (a), (c) and (b), or may comprise steps (c), (a) and (b), and so on.

Unless otherwise specifically stated, the terms "include/including" and "comprise/comprising" mentioned in the present application may be open-ended, or may be closed-ended. For example, the "including" and "comprising" may mean that other components that are not listed are further included or comprised, or only the listed components are included or comprised.

Unless otherwise specifically stated, the term "or" is inclusive in the present application. By way of example, the phrase "A or B" means "A, B, or both A and B." More specifically, the condition "A or B" is satisfied by any one of the following conditions: A is true (or present) and B is false (or absent); A is false (or absent) and B is true (or present); or both A and B are true (or present).

It should be noted that the term "cladding layer" herein refers to a material layer cladded on an inner core of lithium manganese phosphate, and the material layer may completely or partially clad the inner core of lithium manganese phosphate. The "cladding layer" is used only for ease of description, and is not intended to limit the present invention. Likewise, the term "thickness of the cladding layer" refers to a thickness of the material layer cladded on the inner core of lithium manganese phosphate in a radial direction of the inner core of lithium manganese phosphate.

The inventor of the present application found in actual operations that at present, manganese ions are dissolved seriously from existing positive electrode active material lithium manganese phosphate in the process of deep charge and discharge. Although existing techniques try to clad lithium manganese phosphate with lithium iron phosphate to reduce interfacial side reactions, such cladding fails to prevent the dissolved manganese from further migration into the electrolyte solution. The dissolved manganese is reduced to metallic manganese after migration to the negative electrode. The metal manganese produced in this way is equivalent to a "catalyst", which can catalyze the decomposition of the SEI (solid electrolyte interphase) film on the surface of the negative electrode to generate by-products. Part of the by-products are gases, causing bulge of secondary batteries and thus impact on the safety performance of the secondary batteries. In addition, the other part of the by-products is deposited on the surface of the negative electrode, which will hinder the channels of lithium ions into and out of the negative electrode, resulting in an increase in the impedance of the secondary battery, thereby affecting the kinetic performance of the secondary battery. In addition, in order to supplement the lost SEI film, the electrolyte solution and the active lithium inside the battery are constantly consumed, which will have irreversible effects on the capacity retention rate of the secondary battery.

The inventor found after a lot of studies that a novel positive electrode active material having a core-shell structure can be obtained by modification of lithium manganese phosphate and multilayer cladding of lithium manganese phosphate. The positive electrode active material can achieve significantly reduced dissolution of manganese ions and reduced lattice change rate, and is used in the secondary battery to improve the cycling performance, rate performance, and safety performance of the battery, and enhance the capacity of the battery.

[Secondary Battery]

Secondary batteries, also known as rechargeable batteries or storage batteries, refer to batteries that, after being discharged, can activate active materials by charging for continuous use.

In general, the secondary battery comprises a positive electrode plate, a negative electrode plate, a separator, and an electrolyte solution. During charging and discharging of the battery, active ions (e.g., lithium ions) are intercalated and deintercalated back and forth between the positive electrode plate and the negative electrode plate. The separator is arranged between the positive electrode plate and the negative electrode plate, mainly to serve for preventing short circuit between the positive and negative electrodes, and making the active ions pass through. The electrolyte solution serves for conducting the active ions between the positive electrode plate and the negative electrode plate.

An embodiment of the present application provides a secondary battery, comprising a positive electrode plate and a non-aqueous electrolyte solution, where the positive electrode plate comprises a positive electrode active material having a core-shell structure and comprising an inner core and a shell cladding the inner core, where the inner core has a chemical formula of $Li_{1+x}Mn_{1-y}A_yP_{1-z}R_zO_4$, where x is any value ranging from −0.100 to 0.100, y is any value ranging from 0.001 to 0.500, z is any value ranging from 0.001 to 0.100, the A is one or more elements selected from the group consisting of Zn, Al, Na, K, Mg, Mo, W, Ti, V, Zr, Fe, Ni, Co, Ga, Sn, Sb, Nb, and Ge, and is optionally one or more elements among Fe, Ti, V, Ni, Co, and Mg, the R is one or more elements selected from the group consisting of B, Si, N, and S, and optionally, the R is an element selected from B, Si, N, and S; and values of the x, y, and z satisfy a condition of: keeping the whole inner core electroneutral; the shell comprises a first cladding layer cladding the inner core, a second cladding layer cladding the first cladding layer, and a third cladding layer cladding the second cladding layer, where the first cladding layer comprises crystalline pyrophosphates $Li_aMP_2O_7$ and/or $M_b(P_2O_7)_c$, where $0 \leq a \leq 2$, $1 \leq b \leq 4$, and $1 \leq c \leq 6$, values of the a, b, and c satisfy a condition of: keeping the crystalline pyrophosphate $Li_aMP_2O_7$ or $M_b(P_2O_7)_c$ electroneutral, and M in the crystalline pyrophosphates $Li_aMP_2O_7$ and $M_b(P_2O_7)_c$ is each independently one or more elements selected from the group consisting of Fe, Ni, Mg, Co, Cu, Zn, Ti, Ag, Zr, Nb, and Al, the second cladding layer comprises a crystalline phosphate $XPO_4$, where the X is one or more elements selected from the group consisting of Li, Fe, Ni, Mg, Co, Cu, Zn, Ti, Ag, Zr, Nb, and Al, and the third cladding layer is carbon; and the non-aqueous electrolyte solution comprises a first additive comprising one or more compounds in the group consisting of a compound represented by formula 1, a compound represented by formula 2, and a compound represented by formula 3,

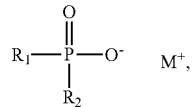

formula 1

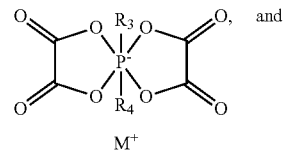

formula 2 and

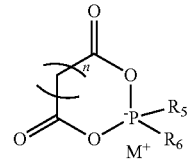

formula 3 wherein $R_1$ and $R_2$ each independently represent any one of F, C1-C6 fluoroalkyl, C1-C6 alkyl, C1-C6 alkoxy, C2-C6 alkenyl, C2-C6 alkynyl, or C6-C10 aryl, and at least one of $R_1$ or $R_2$ represents any one of F or C1-C6 fluoroalkyl;

$R_3$ and $R_4$ each independently represent any one of F, C1-C6 fluoroalkyl, C1-C6 alkyl, C1-C6 alkoxy, C2-C6 alkenyl, or C2-C6 alkynyl, and at least one of $R_3$ or $R_4$ represents any one of F or C1-C6 fluoroalkyl;

$R_5$ and $R_6$ each independently represent any one of F, C1-C6 fluoroalkyl, C1-C6 alkyl, C1-C6 alkoxy, C2-C6 alkenyl, C2-C6 alkynyl, carbonyl, $O^-$, $=O$, $-BF_3$, or $-O^-BF_3$;

M in each chemical formula each independently represents one of an alkali metal or an alkaline earth metal, and n is 0, 1, or 2.

The positive electrode plate generally comprises a positive electrode current collector and a positive electrode film layer arranged on at least one surface of the positive electrode current collector, and the positive electrode film layer comprises the positive electrode active material.

As an example, the positive-electrode current collector has two opposite surfaces in its own thickness direction, and the positive electrode film layer is arranged on either or both of the two opposite surfaces of the positive-electrode current collector.

In some embodiments, the positive electrode current collector can be a metal foil or a composite current collector. For example, an aluminum foil can be used as the metal foil. The composite current collector can comprise a polymer material substrate layer and a metal layer formed on at least one surface of the polymer material substrate layer. The composite current collector may be formed by forming a metal material (such as aluminum, aluminum alloy, nickel, nickel alloy, titanium, titanium alloy, silver, and silver alloy) on a polymer material substrate (such as a substrate of polypropylene (PP), polyethylene terephthalate (PET), polybutylene terephthalate (PBT), polystyrene (PS), or polyethylene (PE)).

Unless stated otherwise, in the chemical formula of the above inner core, when A is two or more elements, the above definition on the numerical range of y is not only a definition on a stoichiometric number of each element as A, but also a definition on a sum of the stoichiometric number of each element as A. For example, when A is two or more elements A1, A2, . . . , An, respective stoichiometric numbers y1, y2, . . . , yn of A1, A2, . . . , An are each required to fall within the numerical range defined for y in the present application, and a sum of y1, y2, . . . , yn are also required to fall within this numerical range. Similarly, in the case where R is two or more elements, the definition on the numerical range of the stoichiometric number of R in the present application also has the above meaning.

In an optional embodiment, when A is one, two, three or four elements selected from Zn, Al, Na, K, Mg, Mo, W, Ti, V, Zr, Fe, Ni, Co, Ga, Sn, Sb, Nb and Ge, $A_y$ is $Q_{n1}D_{n2}E_{n3}K_{n4}$, where n1+n2+n3+n4=y, and n1, n2, n3, and n4 are all positive numbers and not zero at the same time, Q, D, E, and K are independently one selected from Zn, Al, Na, K, Mg, Mo, W, Ti, V, Zr, Fe, Ni, Co, Ga, Sn, Sb, Nb and Ge, and optionally, at least one of Q, D, E and K is Fe. Optionally, one of n1, n2, n3, and n4 is zero, and the rest are not zero; more optionally, two of n1, n2, n3, and n4 are zero, and the rest are not zero; and optionally, three of n1, n2, n3, and n4 are zero, and the rest are not zero. In the inner core $Li_{1+x}Mn_{1-y}A_yP_{1-z}R_zO_4$, it is advantageous to dope one, two, three, or four of the element A at a position of manganese, and optionally, to dope one, two, or three of the element A; and further, it is advantageous to dope one or two of element R at a position of phosphorus, thereby contributing to uniform distribution of the doped elements.

In the inner core $Li_{1+x}Mn_{1-y}A_yP_{1-z}R_zO_4$, a value of x is affected by valence states of A and R and values of y and z, to ensure that the whole system is electroneutral. If the value of x is too small, a lithium content of the whole inner core system will be reduced, thereby affecting the gram capacity of the material. The value of y will limit the total amount of all doping elements. If y is too small, that is, the doping amount is too small, the doping elements are ineffective. If y exceeds 0.5, the content of Mn in the system will be reduced, affecting the voltage plateau of the material. The element R is doped at the position of P. Since the P—O tetrahedron is relatively stable, and a too high z value will affect the stability of the material, the z value is defined to 0.001-0.100.

The positive electrode active material in the present application can improve the gram capacity, cycling performance, and safety performance of the secondary battery. Although the mechanism is still not clear, it is inferred that the positive electrode active material lithium manganese phosphate in the present application is of a core-shell structure, where element A and element R are doped at the position of manganese and the position of phosphorus of the inner core lithium manganese phosphate, respectively, thereby effectively reducing the dissolution of manganese ions, reducing the migration of manganese ions to the negative electrode, reducing the electrolyte solution consumption caused by SEI film decomposition, improving the cycling performance and safety performance of the secondary battery, further promoting Mn—O bond regulation, reducing the lithium-ion migration barrier, promoting the lithium-ion migration, and improving the rate performance of the secondary battery; the inner core is cladded with a first cladding layer comprising the crystalline pyrophosphate, thereby further increasing the migration resistance of manganese, reducing its dissolution, reducing the surface impurity lithium content, reducing the contact between the inner core and the electrolyte solution, reducing the interfacial side reactions, reducing gas production, and improving the high-temperature storage performance, cycling performance, and safety performance of the secondary battery; the inner core is further cladded with a crystalline phosphate with excellent ability to conduct lithium ions, thereby effectively reducing the interfacial side reactions on the surface of the positive electrode active material, and improving the high-temperature cycling performance and storage performance of the secondary battery; and the inner core is further cladded with a carbon layer as a third cladding layer, thereby further improving the safety performance and kinetic performance of the secondary battery.

In addition, in the inner core, the element A doped at the position of manganese of lithium manganese phosphate further contributes to reducing the lattice change rate of lithium manganese phosphate during deintercalation of lithium from the material, improving the structural stability of the positive electrode material lithium manganese phosphate, greatly reducing the dissolution of manganese, and reducing the surface oxygen activity of the particles; and the element R doped at the position of phosphorus further contributes to changing the difficulty in Mn—O bond length changes, thereby improving the electronic conductivity, reducing the lithium ion migration barrier, promoting the lithium ion migration, and improving the rate performance of the secondary battery.

In addition, the whole inner core system remains electroneutral, thereby minimizing the defects and impurity phases in the positive electrode active material. If there are excessive transition metals (such as manganese) in the positive electrode active material, because the structure of the material system itself is relatively stable, the excessive transition metals are very likely to precipitate in the form of simple substances, or form impurity phases inside the lattice, and such impurity phases can be minimized by maintaining electroneutrality. In addition, the system is ensured to be electroneutral, thereby producing lithium vacancies in the material in some cases, so that the kinetic performance of the material is more excellent, and then the kinetic performance of the secondary battery is improved.

Further, a phosphate additive is introduced into the non-aqueous electrolyte solution to form $Li_xF_yPO_4$ on a surface of a pyrophosphate in a charging process of a lithium-ion battery, and improve the ion conducting ability of the pyrophosphate-cladded positive electrode active material lithium manganese phosphate, thereby further improving the capacity and rate performance of the secondary battery comprising the same.

Positions of main characteristic peaks in an XRD pattern of the lithium manganese phosphate doped with the elements A and R are consistent with those of undoped $LiMnPO_4$, indicating that no impurity phase is introduced in the doping process. Therefore, the inner core performance is improved mainly due to element doping rather than the impurity phases. After preparing the above positive electrode active material, the inventor of the present application cut a middle region of the resulting positive electrode active material particles by focused ion beam (FIB for short), and found through testing using a transmission electron microscope (TEM for short) and X-ray energy dispersive spectroscopy (EDS) analysis that the elements are uniformly distributed without occurrence of aggregation.

In the present application, a crystalline state means that the crystallinity is 50% or higher, that is, 50%-100%. A state with a crystallinity of less than 50% is called a glassy state. The crystalline pyrophosphate and the crystalline phosphate in the present application have a crystallinity from 50% to 100%. Pyrophosphates and phosphates with a certain crystallinity not only promote the full exertion of the ability of the pyrophosphate cladding layer to hinder the dissolution of manganese ions, the excellent ability of the phosphate cladding layer to conduct lithium ions, and the function of reducing interfacial side reactions, but also allow for better lattice matching between the pyrophosphate cladding layer and the phosphate cladding layer, thereby enabling tighter bonding between the cladding layers.

In the present application, the crystallinity of the crystalline pyrophosphate in the first cladding layer and the crystalline phosphate in the second cladding layer of the positive electrode active material may be tested by conventional technical means in the art, for example, by densitometry, infrared spectroscopy, differential scanning calorimetry, and NMR absorption, or by, for example, X-ray diffraction.

Specifically, the method for testing the crystallinity of the crystalline pyrophosphate in the first cladding layer and the crystalline phosphate in the second cladding layer of the positive electrode active material by X-ray diffraction may include steps of:

A certain amount of the positive electrode active material powder is taken, and measured for the total scattering intensity by X-ray diffraction, which is the sum of the scattering intensities of the material in the entire space, is only related to the intensity of the primary ray, the chemical structure of the positive electrode active material powder, and the total number of electrons participating in the diffraction, that is, the mass, and is independent of the state order of the sample. The crystalline scattering and the non-crystalline scattering are then split from the diffractogram, and the crystallinity is the ratio of the crystalline scattering to the total scattering intensity.

It should be noted that in the present application, the crystallinity of pyrophosphate and phosphate in the cladding layer can be adjusted, for example, by adjusting the process conditions in the sintering process, such as sintering temperature, sintering time, and the like.

In the present application, since metal ions are difficult to migrate in pyrophosphate, pyrophosphate can be used as the first cladding layer to effectively isolate the doped metal ions from the electrolyte solution. Since the structure of crystalline pyrophosphate is stable, the cladding of crystalline pyrophosphate can effectively inhibit the dissolution of transition metals and improve the cycling performance.

The bond between the first cladding layer and the core is similar to a heterojunction, and the firmness of the bond depends on the degree of lattice matching. When the lattice mismatch is less than 5%, the lattice matching is better, and the two are easy to bond closely. The tight bonding can ensure that the cladding layer will not fall off in the subsequent cycle process, which is beneficial to ensuring the long-term stability of the material. The degree of bonding between the first cladding layer and the core is mainly measured by calculating the mismatch degree of each lattice constant between the core and the cladding layer. In the present application, after the inner core is doped with elements A and R, compared with the case without element doping, the matching degree between the inner core and the first cladding layer is improved, and the inner core and the pyrophosphate cladding layer can be more closely bonded.

Crystalline phosphate is chosen as the second cladding layer. Because crystalline phosphate has higher lattice match (only 3% mismatch) with the first layer cladding material crystalline pyrophosphate; and the stability of phosphate itself is better than that of pyrophosphate, and cladding pyrophosphate therewith facilitate the improvement of the stability of the material. The crystalline phosphate is very stable in structure, and has excellent ability to conduct lithium ions. Therefore, the use of crystalline phosphate for cladding can effectively reduce the interfacial side reactions on the surface of the positive electrode active material, thereby improving the high-temperature cycling performance and storage performance of the secondary battery. The lattice matching between the second cladding layer and the first cladding layer is similar to that for the bonding between the first cladding layer and the core above. When the lattice mismatch is 5% or less, the lattice matching is good, and the two are easy to bond tightly.

The main reason for using carbon as the third cladding layer is the better electronic conductivity of the carbon layer. When use in a secondary battery, an electrochemical reaction takes place, requiring the participation of electrons. Therefore, to increase the electron transport between the particles and the electron transport between different positions on the particles, carbon having excellent conductivity may be used to clad the positive electrode active material. Carbon cladding can effectively improve the conductivity and desolvation ability of the positive electrode active material.

The cladding layers in the present application may be completely cladding or may be partially cladding.

In any embodiment, in the formula 1, the $R_1$ and $R_2$ each independently represent any one of F, C1-C3 fluoroalkyl, C1-C3 alkyl, C1-C3 alkoxy, C2-C3 alkenyl, C2-C3 alkynyl, phenyl, benzyl, or methylphenyl, at least one of $R_1$ or $R_2$ represents any one of F or C1-C3 fluoroalkyl, optionally, $R_1$ and $R_2$ each independently represent any one of F, C1-C3 alkyl, or C1-C3 fluoroalkyl, optionally, the C1-C3 fluoroalkyl is $-CF_3$, $-C_2F_5$, $-CH_2CF_3$, or $-CF_2CH_3$, and the C1-C3 alkyl is methyl or ethyl.

In any embodiment, in the formula 2, $R_3$ and $R_4$ each independently represent any one of F, C1-C3 fluoroalkyl, C1-C3 alkyl, C1-C3 alkoxy, C2-C3 alkenyl, or C2-C3 alkynyl, at least one of $R_3$ or $R_4$ represents any one of F or C1-C3 fluoroalkyl, and optionally, $R_3$ and $R_4$ each independently represent any one of F or C1-C3 fluoroalkyl.

In any embodiment, in the formula 3, $R_5$ and $R_6$ each independently represent any one of F, C1-C3 fluoroalkyl, C1-C3 alkyl, C1-C3 alkoxy, C2-C6 alkenyl, C2-C6 alkynyl, carbonyl, O—, =O, —$^-$BF$_3$, or —O$^-$BF$_3$, optionally, the $R_5$ and $R_6$ each independently represent any one of F, fluoromethyl, methyl, O$^-$, =O, —$^-$BF$_3$, or —O$^-$BF$_3$, and n is 0 or 1.

In any embodiment, M in each chemical formula each independently represents one of Li, Na, or K.

Optionally, the first additive used in the present application may be arbitrarily selected from the above chemical formulas, and in some embodiments, the first additive includes one or more of compounds of:

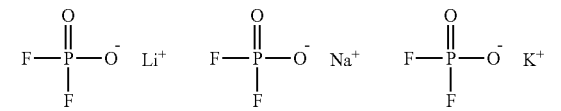
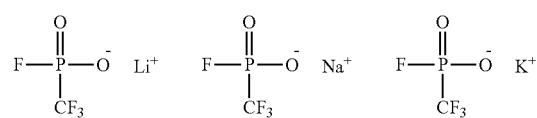
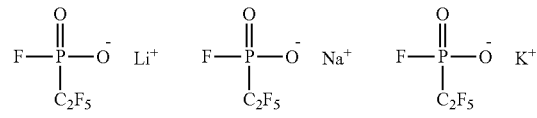
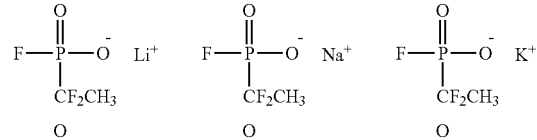
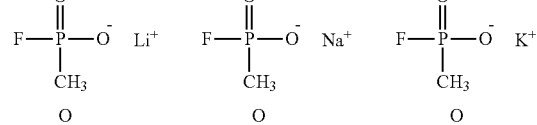
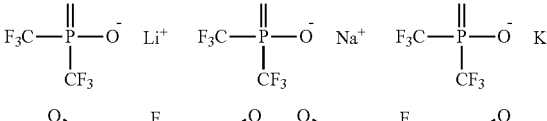
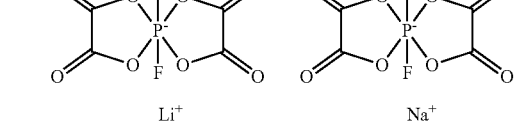
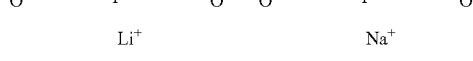
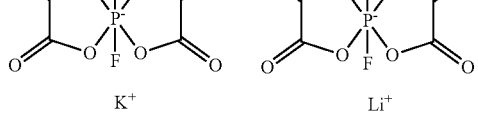
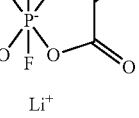
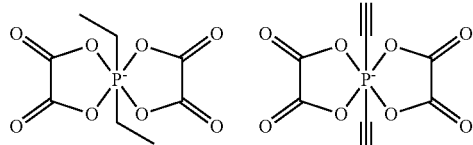

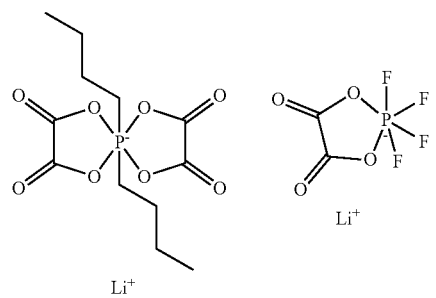
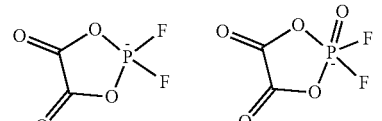
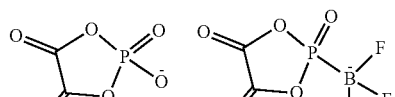
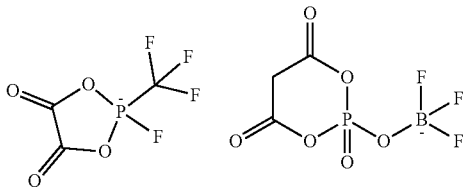
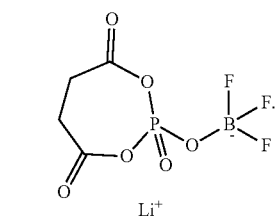

In some embodiments, the first additive includes any one or more compounds of:

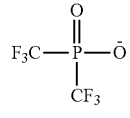
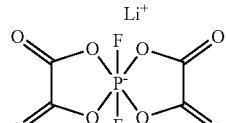
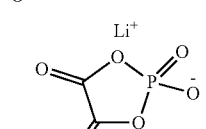

The first additives efficiently form $Li_xF_yPO_4$ in the charging process, thereby more efficiently improving the ion conducting ability of the positive electrode active material in the present application.

In some embodiments, the non-aqueous electrolyte solution further comprises a second additive comprising one or more compounds in the group consisting of an unsaturated bond-containing cyclic carbonate compound, a halogen-substituted cyclic carbonate compound, a sulfate compound, a sulfite compound, a sultone compound, a disulfonic acid compound, a nitrile compound, an aromatic compound, an isocyanate compound, a phosphazene compound, a cyclic anhydride compound, a phosphite compound, a phosphate compound, or a borate compound. The second additive can improve the capacity and cycling performance of the secondary battery according to its own performance, and those skilled in the art can choose a corresponding second additive according to actual requirements.

In some embodiments, based on a total weight of the non-aqueous electrolyte solution, a content of the first additive is W1 wt %, where W1 is from 0.005 to 20, and is optionally from 0.1 to 5, and/or a content of the second additive is W2 wt %, where W2 is from 0.001 to 20, and is optionally from 0.01 to 10. The first additive at the above content not only avoids impedance increase of positive and negative electrodes caused by excessive first additive, but also ensures large capacity and high rate performance of the secondary battery. Therefore, a mass ratio of the first additive in the non-aqueous electrolyte solution in the above range can significantly improve the ion conducting ability of the positive electrode active material in the present application without deteriorating impedance of the positive and negative electrodes, thereby further improving the capacity and rate performance of the secondary battery.

In some embodiments, the W1/W2 is defined as M, where M is from 0.001 to 50, and is optionally from 0.05 to 20. When the W2/W1 is in the above range, the two can play a better synergistic role, thereby further improving the capacity and cycling performance.

In some embodiments, the non-aqueous electrolyte solution further comprises an organic solvent, a type of which is not particularly limited, and which may be selected according to actual requirements. Optionally, the organic solvent includes one or more of a cyclic carbonate compound, a chain carbonate compound, or a carboxylate compound, and further includes one or more compounds in the group consisting of dimethyl carbonate, diethyl carbonate, dipropyl carbonate, ethyl methyl carbonate, methyl propyl carbonate, ethyl propyl carbonate, ethylene carbonate, propylene carbonate, butylene carbonate, γ-butyrolactone, methyl formate, ethyl formate, methyl acetate, ethyl acetate, propyl acetate, methyl propionate, ethyl propionate, butyl propionate, or tetrahydrofuran.

In some embodiments, the non-aqueous electrolyte solution further comprises an electrolyte salt. Optionally, the electrolyte salt comprises one or more compounds in the group consisting of $LiN(C_xF_{2x+1}SO_2)(C_yF_{2y+1}SO_2)$, $Li(FSO_2)_2N$, $LiCF_3SO_3$, $LiPF_6$, $LiBF_4$, $LiAsF_6$, $LiClO_4$, LiBOB, LiDFOB, or LiTFOP, x and y represent positive integers, optionally, x and y are each independently 0, 1, 2, or 3, and a concentration of the electrolyte salt in the non-aqueous electrolyte solution ranges from 0.5 M to 2.5 M, and optionally ranges from 0.8 M to 2 M, thereby ensuring stable and fast migration of $Li^+$ between the positive and negative electrodes.

Generally, a larger specific surface area A of the positive electrode active material will improve the ion conducting ability of the positive electrode plate, thus improving the capacity and rate performance of the secondary battery. However, a too large specific surface area A will increase the contact area between the positive electrode active material and the electrolyte solution, increase the interfacial side reactions, and deteriorate the high-temperature cycling performance and storage performance. In some embodiments, a specific surface area of the above positive electrode active material is A $m^2/g$, where A is from 7 to 18, and is optionally from 10 to 15, so as to provide the positive electrode plate with sufficient ion conducting ability, and avoid a too large specific surface area which will increase interfacial side reactions.

In some embodiments, a content of the first additive corresponding to a unit area of the positive electrode active material is B $mg/m^2$, where B is from 0.001 to 10, and is optionally from 0.01 to 5. When B is less than the above range, additives are not enough to form a film on the surface of the pyrophosphate, and the effect of improving the rate performance of the secondary battery using the non-aqueous electrolyte solution is not significant; and when B is greater than the above range, the excessive first additive will increase the impedance of the positive and negative electrodes to a certain extent, thereby affecting the capacity and rate performance of the secondary battery, and resulting in insignificant improvement of the capacity and rate performance of the secondary battery.

In some embodiments, based on a weight of the inner core, a cladding amount of the first cladding layer is C1 wt %, where C1 is greater than 0 and less than or equal to 6, is optionally greater than 0 and less than or equal to 5.5, and is more optionally greater than 0 and less than or equal to 2. And/or, based on the weight of the inner core, a cladding amount of the second cladding layer is C2 wt %, where C2 is greater than 0 and less than or equal to 6, is optionally greater than 0 and less than or equal to 5.5, and is more optionally from 2 to 4. And/or, based on the weight of the inner core, a cladding amount of the third cladding layer is C3 wt %, where C3 is greater than 0 and less than or equal to 6, is optionally greater than 0 and less than or equal to 5.5, and is more optionally greater than 0 and less than or equal to 2.

In the present application, the cladding amount of each layer is not zero.

In the positive electrode active material having the core-shell structure in the above embodiments, the cladding amounts of the three cladding layers are preferably within the above ranges, thereby fully cladding the inner core, and further improving the kinetic performance and safety performance of the secondary battery without sacrificing the gram capacity of the positive electrode active material.

Regarding the first cladding layer, the cladding amount within the above range can avoid situations that: a too small cladding amount means a small thickness of the cladding layer, and may fail to effectively hinder the migration of the transition metals; and a too large cladding amount means a too large thickness of the cladding layer, will affect the migration of $Li^+$, and then will affect the rate performance of the material.

Regarding the second cladding layer, the cladding amount within the above range can avoid situations that: a too large cladding amount may affect the overall plateau voltage of the material; and a too small cladding amount may fail to achieve adequate cladding effect.

Regarding the third cladding layer, carbon cladding mainly serves for enhancing the electron transmission between particles. However, because the structure further contains a large amount of amorphous carbon, the density of carbon is relatively low. Therefore, a too large cladding amount will affect the compaction density of the electrode plate.

In the positive electrode active material having the core-shell structure in the above embodiments, the cladding amounts of the three cladding layers are preferably within the above ranges, thereby fully cladding the inner core, and further improving the kinetic performance and safety performance of the secondary battery without sacrificing the gram capacity of the positive electrode active material.

In some embodiments, a ratio (W1+W2)/(C1+C2+C3) is defined as Q, where Q is from 0.001 to 2, and is optionally from 0.01 to 1. The Q value is controlled within the above range, thereby avoiding that, when the Q value is less than the above range, the lithium salt or additives are not enough to reduce acidity of the electrolyte solution, the dissolution of manganese ions fails to be fully and completely inhibited, and the improvement degree of high-temperature cycling performance and storage performance is insufficient; while when the Q value is greater than the above range, the film forming impedance is too large, thereby affecting the improvement of the capacity and rate performance of the lithium-ion battery.

In any embodiment, an interplanar spacing of the crystalline pyrophosphate in the first cladding layer ranges from 0.293 to 0.470 nm, and an angle in a crystallographic direction (111) ranges from 18.00° to 32.00°; and an interplanar spacing of the crystalline pyrophosphate in the second cladding layer ranges from 0.244 to 0.425 nm, and an angle in the crystallographic direction (111) ranges from 20.000 to 37.00°.

The crystalline pyrophosphate and crystalline phosphate in the cladding layers can be characterized by conventional technical means in the art, or characterized, for example, with the help of a transmission electron microscope (TEM). Under the TEM, the inner core and the cladding layer can be distinguished by measuring the interplanar spacing.

The specific test method for the interplanar spacing and angle of crystalline pyrophosphate and crystalline phosphate in the cladding layers may include the following steps:

A certain amount of the cladded positive electrode active material sample powder is charged in a test tube, and a solvent such as alcohol is injected into the test tube, and then stirred fully to disperse the powder. Then an appropriate amount of the solution is taken by a clean disposable plastic pipette and dropped on a 300-mesh copper screen. At this time, some of the powder will remain on the copper screen. The copper screen with the sample is transferred to a TEM sample cavity and tested, to obtain an original TEM image which is saved.

The original image obtained from the TEM test is opened in diffractometer software, to obtain a diffraction pattern by Fourier transform. A distance from a diffraction spot to a center position in the diffraction pattern is measured to obtain the interplanar spacing, and the angle is calculated according to the Bragg equation.

The interplanar spacing range of the crystalline pyrophosphate is different from the interplanar spacing range of the crystalline phosphate, and can be directly ascertained based on the value of the interplanar spacing.

A crystalline substance is used in both the first cladding layer and the second cladding layer of the positive electrode active material in the above embodiments, with interplanar spacing and angle ranges thereof falling within the above ranges, thereby effectively avoiding impurity phases in the cladding layer, and improving the gram capacity, cycling performance, and rate performance of the material. Further, the crystalline pyrophosphate and the crystalline phosphate in the above interplanar spacing and angle ranges can more effectively inhibit the lattice change rate of lithium manganese phosphate during deintercalation of lithium and the dissolution of manganese ions, thereby improving the high-temperature cycling performance, cycling stability, and high-temperature storage performance of the secondary battery.

In some embodiments, in the inner core, a ratio of y to 1−y is from 1:10 to 1:1, and is optionally from 1:4 to 1:1. When the above conditions are satisfied, the energy density and cycling performance of the secondary battery using the positive electrode active material can be further improved.

In some embodiments, in the inner core, a ratio of z to 1−z is from 1:9 to 1:999, and is optionally from 1:499 to 1:249. Here, z represents a sum of stoichiometric numbers of P-doped element R. When the above conditions are satisfied, the energy density and cycling performance of the secondary battery using the positive electrode active material can be further improved.

In some embodiments, carbon of the third cladding layer is a mixture of SP2 hybridized carbon and SP3 hybridized carbon, and optionally, a molar ratio of the SP2 hybridized carbon to the SP3 hybridized carbon is any value ranging from 0.1 to 10, and is optionally any value ranging from 2.0 to 3.0.

In some embodiments, the molar ratio of the SP2 hybridized carbon to the SP3 hybridized carbon may be about 0.1, about 0.2, about 03, about 0.4, about 0.5, about 0.6, about 0.7, about 0.8, about 0.9, about 1, about 2, about 3, about 4, about 5, about 6, about 7, about 8, about 9, or about 10, or within any range of any of the above values.

In the present application, "about" a value represents a range of ±10% of the value.

By selecting the state of carbon in the carbon cladding layer, the overall electrical performance of the secondary battery can be improved. Specifically, the mixture form of the SP2 hybridized carbon and the SP3 hybridized carbon is used, and the ratio of the SP2 hybridized carbon to the SP3 hybridized carbon is limited to a certain range, thereby avoiding situations that: if all carbon in the cladding layer is amorphous SP3 hybridized carbon, the conductivity is poor; if all carbon in the cladding layer is graphitized SP2 hybridized carbon, the conductivity is good, but there are fewer channels of lithium ions, which is not conducive to the deintercalation of lithium. In addition, the molar ratio of the SP2 hybridized carbon to the SP3 hybridized carbon is limited to the above range, thereby not only achieving good conductivity, but also ensuring the channels of lithium ions, and contributing to the function optimization of the secondary battery and the improvement of the cycling performance of the secondary battery.

A mixing ratio of the SP2 hybridized carbon to the SP3 hybridized carbon in the third cladding layer can be controlled based on sintering conditions, e.g., a sintering temperature and sintering time. For example, when the third cladding layer is prepared using sucrose as a carbon source, after the sucrose is pyrolyzed at a high temperature, the deposition on the second cladding layer at a high temperature will produce the carbon cladding layer comprising both the SP3 hybridized carbon and the SP2 hybridized carbon. The ratio of the SP2 hybridized carbon to the SP3 hybridized carbon can be controlled by selecting high-temperature pyrolysis conditions and sintering conditions.

The carbon structure and characteristics of the third cladding layer can be determined by Raman spectroscopy, and the testing methods specifically includ: splitting a spectrum of the Raman test to obtain Id/Ig (where Id is a peak intensity of the SP3 hybridized carbon and Ig is a peak intensity of the SP2 hybridized carbon), thereby determining the molar ratio of the two.

In some embodiments, a thickness of the first cladding layer is from 1 to 10 nm; and/or a thickness of the second cladding layer is from 2 to 15 nm; and/or a thickness of the third cladding layer is from 2 to 25 nm.

In some embodiments, the thickness of the first cladding layer may be about 2 nm, about 3 nm, about 4 nm, about 5 nm, about 6 nm, about 7 nm, about 8 nm, about 9 nm, or about 10 nm, or within any range of any of the above values.

In some embodiments, a thickness of the second cladding layer may be about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, or about 15 nm, or within any range of any of the above values.

In some embodiments, a thickness of the third cladding layer may be about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 21 nm, about 22 nm, about 23 nm, about 24 nm, or about 25 nm, or within any range of any of the above values.

When the thickness of the first cladding layer ranges from 1 to 10 nm, not only can potential adverse effects of too large thickness on the kinetic performance of the material be avoided, but also the problem of too small thickness failing to hinder the migration of transition metal ions can be avoided.

When the thickness of the second cladding layer ranges from 2 and 15 nm, the surface structure of the second cladding layer is stable with less side reactions with the electrolyte solution, thereby effectively reducing interfacial side reactions, and further improving the high-temperature performance of the secondary battery.

When the thickness of the third cladding layer ranges from 2 to 25 nm, the conductivity of the material can be further improved, and the compacted density performance of the battery electrode plate prepared using the positive electrode active material can be better improved.

The thickness of the cladding layer is tested mainly by FIB, specifically including steps of: randomly selecting a single particle from the to-be-tested positive electrode active material powder, cutting a thin slice with a thickness of about 100 nm from a middle position or near the middle position of the selected particle, then testing the thin slice under a TEM, measuring the thickness of the cladding layer at 3-5 positions, and computing an average value.

In some embodiments, based on a weight of the positive electrode active material, a content of element manganese ranges from 10 wt % to 35 wt %, optionally ranges from 15 wt % to 30 wt %, and more optionally ranges from 17 wt % to 20 wt %; a content of element phosphorus ranges from 12 wt % to 25 wt %, and optionally ranges from 15 wt % to 20 wt %; and a weight ratio of element manganese to element phosphorus ranges from 0.90 to 1.25, and optionally ranges from 0.95 to 1.20.

In the present application, when only the inner core of the positive electrode active material contains manganese, the content of manganese may correspond to a content of the inner core.

In the above embodiments, the content of element manganese is limited to the above range, thereby effectively avoiding problems such as structural stability decline and density decrease of the material that may be caused by a too high content of element manganese, effectively improving the cycling performance, storage performance, and compacted density performance of the secondary battery; avoiding a problem of low voltage plateau that may be caused by a too low content of element manganese, and further increasing the energy density of the secondary battery.

In the above embodiments, the content of element phosphorus is limited to the above range, thereby effectively avoiding situations that: a too high content of element phosphorus may cause too strong covalency of P—O, thereby affecting the conductivity of small polarons, and affecting the conductivity of the material; and a too low content of phosphorus may decrease lattice structure stability of the pyrophosphate in the inner core and the first cladding layer and/or the phosphate in the second cladding layer, thereby affecting the overall stability of the material.

A weight ratio of the manganese content to the phosphorus content has the following effects on the performance of the secondary battery: a too large weight ratio means that there is excessive element manganese, and the dissolution of manganese ions increases, thereby affecting the stability and gram capacity of the positive electrode active material, and then affecting the cycling performance and storage performance of the secondary battery; and a too small weight ratio means that there is excessive element phosphorus, impurity phases are prone to be formed, and the discharge voltage plateau of the material will be reduced, thereby reducing the energy density of the secondary battery.

The element manganese and element phosphorus may be measured by conventional technical means in the art. In particular, the contents of element manganese and element phosphorus are determined by: dissolving the material in dilute hydrochloric acid (concentration: 10-30%), testing the content of each element in the solution using ICP, and then measuring and converting the content of element manganese to obtain its weight ratio.

In some embodiments, a lattice change rate of the positive electrode active material having the core-shell structure is 4% or less, optionally 3.8% or less, and more optionally from 2.0 to 3.8%, before and after complete deintercalation of lithium.

The process of deintercalation of lithium from lithium manganese phosphate ($LiMnPO_4$) is a two-phase reaction. The two-phase interfacial stress is determined by the lattice change rate before and after deintercalation of lithium. The smaller the lattice change rate is, the smaller the interfacial stress is, and the easier the transmission of $Li^+$ is. Therefore, reducing the lattice change rate of the inner core will be beneficial to enhance the transmission capacity of $Li^+$, thereby improving the rate performance of the secondary battery. The positive electrode active material having the core-shell structure in the above embodiments can achieve the lattice change rate of 4% or less before and after deintercalation of lithium. Therefore, use of the positive electrode active material can improve the rate performance of the secondary battery. The lattice change rate may be determined by a method known in the art, e.g., an X-ray diffraction (XRD) pattern.

In some embodiments, an antisite defect concentration of Li/Mn of the positive electrode active material having the core-shell structure is 4% or less, is optionally 2.2% or less, and is more optionally from 1.5 to 2.2%.

The antisite defect of Li/Mn in the present application refers to, in the $LiMnPO_4$ lattice, interchange of positions of $Li^+$ and $Mn^{2+}$. Accordingly, the antisite defect concentration of Li/Mn refers to a percentage of $Li^+$ interchanged with $Mn^{2+}$ among all $Li^+$. In the present application, the antisite defect concentration of Li/Mn may be tested, for example, in accordance with JIS K 0131-1996.

The positive electrode active material having the core-shell structure in the above embodiments can achieve the above low antisite defect concentration of Li/Mn. Although the mechanism is still not very clear, the inventor of the present application infers that in the $LiMnPO_4$ lattice, the positions of $Li^+$ and $Mn^{2+}$ will be interchanged, and the transmission channel of $Li^+$ is a one-dimensional channel, so that it is difficult for $Mn^{2+}$ to migrate in the channel of $Li^+$, thus hindering the transmission of $Li^+$. Hence, because of the low antisite defect concentration of Li/Mn within the above range, the positive electrode active material having the core-shell structure according to the present application can prevent $Mn^{2+}$ from hindering the transmission of $Li^+$, and improve the gram capacity and rate performance of the positive electrode active material.

In some embodiments, a compaction density of the positive electrode active material under 3 T is 2.2 $g/cm^3$ or more, and is optionally more than 2.2 $g/cm^3$ and less than 2.8 $g/cm^3$. The higher the compaction density is, the higher the weight of the active material per unit volume is. Therefore, improving the compaction density is beneficial to improve the volumetric energy density of the battery cell. The compaction density can be measured in accordance with GB/T 24533-2009.

In some embodiments, a surface oxygen valence state of the positive electrode active material is −1.90 or less, and is optionally from −1.90 to −1.98.

The stable valence state of oxygen is −2, and the closer the valence state is to −2, the stronger the electron receiving ability is, that is, the stronger the oxidizability is. In general, the surface valence state is −1.7 or less. In the above embodiments, the surface oxygen valence state of the positive electrode active material is limited to the above range as described above, thereby reducing interfacial side reactions between the positive electrode material and the electrolyte solution, and improving the cycling performance, high-temperature storage performance and gas production of the battery cell.

The surface oxygen valence state may be measured using a method known in the art, e.g., by electron energy loss spectroscopy (EELS).

The present application further provides a method for preparing a positive electrode active material, including:
  a step of providing an inner core material: where the inner core has a chemical formula of $Li_{1+x}Mn_{1-y}A_yP_{1-z}R_zO_4$, where x is any value ranging from −0.100 to 0.100, y is any value ranging from 0.001 to 0.500, z is any value ranging from 0.001 to 0.100, the A is one or more elements selected from Zn, Al, Na, K, Mg, Mo, W, Ti, V, Zr, Fe, Ni, Co, Ga, Sn, Sb, Nb, and Ge, and is optionally one or more elements among Fe, Ti, V, Ni, Co, and Mg, the R is one or more elements selected from B, Si, N, and S, and optionally, the R is an element selected from B, Si, N, and S;
  a cladding step: providing $Li_aMP_2O_7$ and/or $M_b(P_2O_7)_c$, and a suspension of $XPO_4$, respectively, adding the inner core material into the above suspension, mixing the mixture, and sintering to obtain the positive electrode active material, where 0≤a≤2, 1≤b≤4, and 1≤c≤6, values of the a, b, and c satisfy a condition of: keeping the crystalline pyrophosphate $Li_aMP_2O_7$ or $M_b(P_2O_7)_c$ electroneutral; M is each independently one or more elements selected from Fe, Ni, Mg, Co, Cu, Zn, Ti, Ag, Zr, Nb, or Al; and X is one or more elements selected from Li, Fe, Ni, Mg, Co, Cu, Zn, Ti, Ag, Zr, Nb, or Al;

The positive electrode active material has a core-shell structure, which includes an inner core and a shell cladding the inner core. The shell includes a first cladding layer cladding the inner core, a second cladding layer cladding the first cladding layer and a third cladding layer cladding the second cladding layer. The first cladding layer comprises crystalline pyrophosphate $Li_aMP_2O_7$ and/or $M_b(P_2O_7)_c$, the second cladding layer includes crystalline phosphate $XPO_4$, and the third cladding layer is carbon.

In some embodiments, the step of providing an inner core material comprises:
  Step (1): mixing a manganese source, a dopant of element A and an acid in a container with stirring to obtain manganese salt particles doped with element A; and
  Step (2): mixing the manganese salt particles doped with element A with a lithium source, a phosphorus source, and a dopant of element R in a solvent to obtain a slurry, and sintering under an inert gas atmosphere to obtain an inner core doped with the element A and the element R, where the inner core doped with the element A and the element R is $Li_{1+x}Mn_{1-y}A_yP_{1-z}R_zO_4$, where x is any value ranging from −0.100 to 0.100; y is any value ranging from 0.001 to 0.500; z is any value ranging from 0.001 to 0.100; the A is one or more elements selected from Zn, Al, Na, K, Mg, Mo, W, Ti, V, Zr, Fe, Ni, Co, Ga, Sn, Sb, Nb and Ge, and optionally one or more elements selected from Fe, Ti, V, Ni, Co and Mg; and the R is one or more elements selected from B, Si, N and S, and optionally, the R is one element selected from B, Si, N and S.

The preparation method of the present application has no particular limitation on the source of the material, and the source of a certain element may include one or more of a simple substance, a sulfate, a halide, a nitrate, an organic acid salt, an oxide, or a hydroxide of the element, provided that the purpose of the preparation method of the present application can be achieved with the source.

In some embodiments, the dopant of element A is one or more of a simple substance, a carbonate, a sulfate, a chloride, a nitrate, an organic acid salt, an oxide, and a hydroxide of one or more elements selected from Zn, Al, Na, K, Mg, Mo, W, Ti, V, Zr, Fe, Ni, Co, Ga, Sn, Sb, Nb and Ge.

In some embodiments, the dopant of element R is one or more of an inorganic acid, a hypoloric acid, an organic acid, a sulfate, a chloride, a nitrate, an organic acid salt, an oxide, and a hydroxide of one or more elements selected from B, Si, N and S.

In the present application, the manganese source may be a manganese-containing material known in the art that can be used to prepare lithium manganese phosphate. For example, the manganese source may be one or more selected from elemental manganese, manganese dioxide, manganese phosphate, manganese oxalate, and manganese carbonate.

In the present application, the acid may be one or more selected from inorganic acids such as hydrochloric acid, sulfuric acid, nitric acid, phosphoric acid, silicic acid, silicic acid, and the like, and organic acids such as oxalic acid. In some embodiments, the acid is a dilute organic acid with a concentration of 60 wt % or less.

In the present application, the lithium source may be a lithium-containing material known in the art that can be used to prepare lithium manganese phosphate. For example, the lithium source isone or more selected from lithium carbonate, lithium hydroxide, lithium phosphate, and lithium dihydrogen phosphate.

In the present application, the phosphorus source may be a phosphorus-containing material known in the art that can be used to prepare lithium manganese phosphate. For example, the phosphorus source is one or more selected from diammonium hydrogen phosphate, ammonium dihydrogen phosphate, ammonium phosphate and phosphoric acid.

In some optional embodiments, after the manganese source, the dopant of element A and the acid are reacted in a solvent to obtain a suspension of a manganese salt doped with element A, the suspension is filtered, oven dried and sanded to obtain element A doped manganese salt particles with a particle size of 50-200 nm.

In some optional embodiments, the slurry in Step (2) is dried to obtain a powder, and then the powder is sintered to obtain an inner core doped with element A and element R.

In some embodiments, the mixture in the step (1) is mixed at a temperature from 20 to 120° C., and optionally from 40 to 120° C.; and/or
the stirring in the step (1) is performed at 400-700 rpm for 1-9 h, and optionally for 3-7 h.

Optionally, a reaction temperature in the step (1) may be about 30° C., about 50° C., about 60° C., about 70° C., about 80° C., about 90° C., about 100° C., about 110° C., or about 120° C.; the stirring in the step (1) is performed for about 2 h, about 3 h, about 4 h, about 5 h, about 6 h, about 7 h, about 8 h, or about 9 h; and optionally, the reaction temperature and the stirring time in the step (1) may be within any range of any of the above values.

In some embodiments, the mixture in the step (2) is mixed for 1-12 h at a temperature from 20 to 120° C., and optionally from 40 to 120° C. Optionally, the reaction temperature in the step (2) may be about 30° C., about 50° C., about 60° C., about 70° C., about 80° C., about 90° C., about 100° C., about 110° C., or about 120° C.; the mixing in the step (2) is performed for about 2 h, about 3 h, about 4 h, about 5 h, about 6 h, about 7 h, about 8 h, about 9 h, about 10 h, about 11 h, or about 12 h; and optionally, the reaction temperature and the mixing time in the step (2) may be within any range of any of the above values.

When the temperature and time in the process of preparing inner core particles are within the above ranges, the resulting inner core and the positive electrode active material prepared therefrom have fewer lattice defects, thereby contributing to inhibiting the dissolution of manganese ions, reducing interfacial side reactions between the positive electrode active material and the electrolyte solution, and improving the cycling performance and safety performance of the secondary battery.

In some embodiments, optionally, in a process of preparing dilute acid manganese particles doped with the element A and the element R, the solution is controlled at a pH of 3.5-6, is optionally controlled at a pH of 4-6, and is more optionally controlled at a pH of 4-5. It should be noted that in the present application, the pH of the obtained mixture can be adjusted by methods commonly used in the art, for example, by adding an acid or a base.

In some embodiments, optionally, in Step (2), the molar ratio of the manganese salt particles to the lithium source and the phosphorus source is 1:0.5-2.1:0.5-2.1, and more optionally, the molar ratio of the manganese salt particles doped with element A to the lithium source and the phosphorus source is about 1:1:1.

In some embodiments, optionally, the sintering conditions in the process of preparing lithium manganese phosphate doped with the element A and the element R include: sintering in an atmosphere of an inert gas or a mixed gas of an inert gas and hydrogen at 600-950° C. for 4-10 h; where optionally, the sintering may be performed at about 650° C., about 700° C., about 750° C., about 800° C., about 850° C., or about 900° C. for about 2 h, about 3 h, about 4 h, about 5 h, about 6 h, about 7 h, about 8 h, about 9 h, or about 10 h; and optionally, the sintering temperature and the sintering time may be within any range of any of the above values. In the process of preparing lithium manganese phosphate doped with the elements A and R, if the sintering temperature is too low and the sintering time is too short, the crystallinity of the inner core will be low, affecting the overall performance; if the sintering temperature is too high, impurity phases are prone to appear in the inner core of the material, affecting the overall performance; and if the sintering time is too long, the particle size of the inner core particles of the material becomes larger, affecting the gram capacity, compaction density and rate performance.

In some optional embodiments, optionally, the protective atmosphere is a mixed gas of 70-90 vol % nitrogen and 10-30 vol % hydrogen.

In some embodiments, the cladding step comprises:
a first cladding step, comprising: dissolving a source of element M, a phosphorus source, an acid and optionally a lithium source in a solvent to obtain a first cladding layer suspension; mixing the inner core obtained in the inner core step and the first cladding layer suspension obtained in the first cladding step fully, drying and then sintering to obtain a material cladded with a first cladding layer;

a second cladding step, comprising: dissolving a source of element X, a phosphorus source, and an acid in a solvent to obtain a second cladding layer suspension; mixing the material cladded with the first cladding layer obtained in the first cladding step with the second cladding layer suspension obtained in the second cladding step fully, drying, and then sintering to obtain a material cladded with two cladding layers; and a third cladding step, comprising: fully dissolving a carbon source in a solvent, to obtain a third cladding layer solution; then adding the material cladded with two cladding layers obtained in the second cladding step into the third cladding layer solution, mixing uniformly, drying, and then sintering to obtain a material cladded with three cladding layers, that is, the positive electrode active material.

In some embodiments, the source of element M is one or more of a simple substance, a carbonate, a sulfate, a chloride, a nitrate, an organic acid salt, an oxide, and a hydroxide of one or more elements selected from Fe, Ni, Mg, Co, Cu, Zn, Ti, Ag, Zr, Nb or Al.

In some embodiments, the source of element X is one or more of a simple substance, a carbonate, a sulfate, a chloride, a nitrate, an organic acid salt, an oxide, and a hydroxide of one or more elements selected from Li, Fe, Ni, Mg, Co, Cu, Zn, Ti, Ag, Zr, Nb or Al.

The amounts of respective sources of elements A, R, M, and X depend on the target doping amounts, and the ratio of the amounts of the lithium source, the manganese source, and the phosphorus source conforms to the stoichiometric ratio.

As an example, the carbon source is one or more selected from starch, sucrose, glucose, polyvinyl alcohol, polyethylene glycol, and citric acid.

In some embodiments, in the first cladding step, a solution of a source of dissolved element M, a phosphorus source, an acid, and optionally a lithium source is controlled at a pH of 3.5-6.5, and then stirred for reaction for 1-5 h; then the solution is heated to 50-120° C., and kept at the temperature for 2-10 h; and/or sintering is performed at 650-800° C. for 2-6 h.

Optionally, in the first cladding step, the reaction is fully performed. Optionally, in the first cladding step, the reaction is performed for about 1.5 h, about 2 h, about 3 h, about 4 h, about 4.5 h, or about 5 h. Optionally, in the first cladding step, the reaction time of the reaction may be within any range defined any of the above-mentioned values.

Optionally, in the first cladding step, the pH of the solution is controlled to 4-6. Optionally, in the first cladding step, the solution is heated to about 55° C., about 60° C., about 70° C., about 80° C., about 90° C., about 100° C., about 110° C., or about 120° C., and kept at the temperature for about 2 h, about 3 h, about 4 h, about 5 h, about 6 h, about 7 h, about 8 h, about 9 h, or about 10 h; and optionally, in the first cladding step, the reaction temperature and the retention time may be within any range of any of the above values.

Optionally, in the first cladding step, the sintering may be performed at about 650° C., about 700° C., about 750° C., or about 800° C. for about 2 h, about 3 h, about 4 h, about 5 h, or about 6 h; and optionally, the sintering temperature and the sintering time may be within any range of any of the above values.

In the first cladding step, the sintering temperature and the sintering time are controlled within the above range, to avoid situations that: when the sintering temperature is too low and the sintering time is too short in the first cladding step, the crystallinity of the first cladding layer will be low, and there will be more amorphous substances, thus decreasing the effect of inhibiting metal dissolution, and affecting the cycling performance and high-temperature storage performance of the secondary battery; when the sintering temperature is too high, impurity phases will appear in the first cladding layer, and its effect of inhibiting metal dissolution will also be affected, thus affecting the cycling performance and high-temperature storage performance of the secondary battery; and when the sintering time is too long, the thickness of the first cladding layer will increase, thereby affecting the migration of $Li^+$, and affecting the gram capacity and rate performance of the material.

In some embodiments, in the second cladding step, a source of element X, a phosphorus source, and an acid are dissolved in a solvent, and the solution is stirred for reaction for 1-10 h; then the solution is heated to 60-150° C. and kept at the temperature for 2-10 h; and/or the sintering is performed at 500-700° C. for 6-10 h.

Optionally, in the second cladding step, the reaction is fully performed. Optionally, in the second cladding step, the reaction is performed for about 1.5 h, about 2 h, about 3 h, about 4 h, about 4.5 h, about 5 h, about 6 h, about 7 h, about 8 h, about 9 h, or about 10 h. Optionally, in the second cladding step, the reaction time of the reaction may be within any range of any of the above values.

Optionally, in the second cladding step, the solution is heated to about 65° C., about 70° C., about 80° C., about 90° C., about 100° C., about 110° C., about 120° C., about 130° C., about 140° C., or about 150° C., and kept at the temperature for about 2 h, about 3 h, about 4 h, about 5 h, about 6 h, about 7 h, about 8 h, about 9 h, or about 10 h; and optionally, in the second cladding step, the heating temperature and the retention time may be within any range of any of the above values.

In the step of providing the inner core material and the first cladding step and the second cladding step, before sintering, that is, in the preparation of the chemically reacted inner core material (steps (1)-(2)) and in the preparation of the first cladding layer suspension and the second cladding layer suspension, by selecting appropriate reaction temperature and reaction time as described above, the following situations can be avoided: when the reaction temperature is too low, the reaction fails to take place or the reaction rate is slow; when the temperature is too high, the product is decomposed or impurity phases are formed; when the reaction time is too long, the particle size of the product is larger, which may increase the time and difficulty of the subsequent process; and when the reaction time is too short, the reaction is incomplete, and fewer products are obtained.

Optionally, in the second cladding step, the sintering may be performed at about 550° C., about 600° C., or about 700° C. for about 6 h, about 7 h, about 8 h, about 9 h, or about 10 h; and optionally, the sintering temperature and the sintering time may be within any range of any of the above values.

In the second cladding step, the sintering temperature and the sintering time are controlled within the above range, to avoid situations that: when the sintering temperature is too low and the sintering time is too short in the second cladding step, the crystallinity of the first cladding layer will be low, and there will be more amorphous substances, thus decreasing the surface reactivity of the material, and affecting the cycling performance and high-temperature storage performance of the secondary battery, etc.; when the sintering temperature is too high, impurity phases will appear in the second cladding layer, and its effect of reducing the surface reactivity of the material will also be affected, thus affecting the cycling performance and high-temperature storage performance of the secondary battery, etc.; and when the sintering time is too long, the thickness of the second cladding layer will be increased, thereby affecting the voltage plateau of the material, and reducing the energy density of the material, etc.

In some embodiments, the sintering in the third cladding step is performed at 700-800° C. for 6-10 h. Optionally, in the third cladding step, the sintering may be performed at about 700° C., about 750° C., or about 800° C. for about 6 h, about 7 h, about 8 h, about 9 h, or about 10 h; and optionally, the sintering temperature and the sintering time may be within any range of any of the above values.

In the third cladding step, the sintering temperature and the sintering time are controlled within the above range, to avoid situations that: when the sintering temperature is too low in the third cladding step, the graphitization degree of the third cladding layer will decrease, thereby affecting its conductivity and affecting the gram capacity of the material; when the sintering temperature is too high, the graphitization degree of the third cladding layer will be too high, thereby affecting the transmission of $Li^+$, and affecting the gram capacity of the material, etc.; when the sintering time is too short, the cladding layer will be too thin, thereby affecting tis conductivity, and affecting the gram capacity of the material; and when the sintering time is too long, the cladding layer will be too thick, thereby affecting the compaction density of the material, etc.

In the first cladding step, the second cladding step, and the third cladding step, the drying is performed at a drying temperature from 100° C. to 200° C., optionally from 110° C. to 190° C., more optionally from 120° C. to 180° C., even more optionally from 120° C. to 170° C., and most optionally from 120° C. to 160° C., for drying time of 3-9 h, optionally 4-8 h, more optionally 5-7 h, and most optionally about 6 h.

After cycling of the secondary battery prepared from the positive electrode active material prepared using the method for preparing a positive electrode active material according to the present application, the dissolution of Mn and element doped at the position of Mn is reduced, and the high-temperature stability, high-temperature cycling performance, and rate performance are improved. In addition, the raw materials are widely sourced with low costs and simple processes, thereby contributing to the realization of industrialization. In any embodiment, a surface oxygen valence state of the positive electrode active material having the core-shell structure is −1.90 or less, and is optionally from −1.90 to −1.98. Hence, the surface oxygen valence state of the positive electrode active material is limited to the above range as described above, thereby further reducing interfacial side reactions between the positive electrode material and the electrolyte solution, and improving the cycling performance, high-temperature storage performance and gas production of the battery cell. In some embodiments, the positive electrode film layer may further include other positive electrode active materials for a secondary battery well-known in the art. As an example, the positive electrode active material may include at least one of the following materials: a lithium-containing phosphate of olivine structure, a lithium transition metal oxide, and a respective modified compound thereof. However, the present application is not limited to these materials, and other conventional materials useful as positive electrode active materials for secondary batteries can also be used. These positive electrode active materials may be used alone or in combination of two or more thereof. Examples of lithium transition metal oxides may include, but are not limited to, at least one of lithium nickel oxide (e.g., $LiNiO_2$), lithium manganese oxide (e.g., $LiMnO_2$ or $LiMn_2O_4$), lithium nickel cobalt oxide, lithium manganese cobalt oxide, lithium nickel manganese oxide, and a modified compound thereof. Examples of the lithium-containing phosphate of olivine structure may include, but are not limited to, at least one of lithium iron phosphate (such as $LiFePO_4$ (also abbreviated as LFP)), a composite material of lithium iron phosphate and carbon, lithium manganese phosphate (such as $LiMnPO_4$), a composite material of lithium manganese phosphate and carbon, lithium iron manganese phosphate, and a composite material of lithium iron manganese phosphate and carbon.

In some embodiments, the positive electrode film layer further optionally comprises a binder. As an example, the binder may include at least one of polyvinylidene fluoride (PVDF), polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer and a fluorine-containing acrylate resin.

In some embodiments, the positive electrode film layer further optionally comprises a conductive agent. As an example, the conductive agent may include at least one of superconducting carbon, acetylene black, carbon black, Ketjen black, carbon dot, carbon nanotube, graphene, and carbon nanofiber.

In some embodiments, the positive electrode plate may be prepared by: dispersing the above ingredients, such as the positive electrode active material, the conductive agent, the binder, and any other ingredient, for preparing the positive electrode plate in a solvent (such as N-methyl pyrrolidone) to form a positive electrode slurry; and coating the positive electrode slurry on the positive electrode current collector, drying, and cold pressing, to obtain the positive electrode plate.

[Negative Electrode Plate]

The negative electrode plate comprises a negative electrode current collector and a negative electrode film layer arranged on at least one surface of the negative electrode current collector, and the negative electrode film layer comprises a negative electrode active material.

As an example, the negative electrode current collector has two surfaces opposite in its own thickness direction, and the negative electrode film layer is arranged on either one or both of the two opposite surfaces of the negative electrode current collector.

In some embodiments, the negative electrode current collector can be a metal foil or a composite current collector. For example, a copper foil can be used as the metal foil. The composite current collector may comprise a polymer material substrate layer and a metal layer formed on at least one surface of a polymer material substrate. The composite current collector may be formed by forming a metal material (such as copper, copper alloy, nickel, nickel alloy, titanium, titanium alloy, silver, and silver alloy) on the polymer material substrate (such as a substrate of polypropylene (PP), polyethylene terephthalate (PET), polybutylene terephthalate (PBT), polystyrene (PS), or polyethylene (PE)).

In some embodiments, a negative electrode active material for a battery well-known in the art may be used as the negative electrode active material. As an example, the negative electrode active material may include at least one of artificial graphite, natural graphite, soft carbon, hard carbon, a silicon-based material, a tin-based material, lithium titanate, and the like. The silicon-based material may be at least one selected from elemental silicon, silicon-oxygen compound, silicon-carbon composite, silicon-nitrogen composite, and silicon alloy. The tin-based material may be at least one selected from elemental tin, tin-oxygen compound, and tin alloy. However, the present application is not limited to these materials, and other conventional materials useful as negative electrode active materials for batteries can also be used. These negative electrode active materials may be used alone or in combination of two or more thereof.

In some embodiments, the negative electrode film layer further optionally comprises a binder. As an example, the binder may be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer further optionally comprises a conductive agent. As an example, the conductive agent may be selected from at least one of superconducting carbon, acetylene black, carbon black, Ketjen black, carbon dot, carbon nanotube, graphene, and carbon nanofiber.

In some embodiments, the negative electrode film layer further optionally comprises other adjuvants, for example, a thickener (such as sodium carboxymethylcellulose (CMC-Na)).

In some embodiments, the negative electrode plate may be prepared by: dispersing the above ingredients, such as the negative electrode active material, the conductive agent, the binder, and any other ingredient, for preparing the negative electrode plate in a solvent (such as deionized water) to form a negative electrode slurry; and coating the negative electrode slurry on the negative electrode current collector, drying, and cold pressing, to obtain the negative electrode plate.

[Separator]

In some embodiments, the secondary battery further comprises a separator. The type of the separator is not particularly limited in the present application, and any well-known separator with a porous structure having good chemical stability and mechanical stability may be selected.

In some embodiments, the material of the separator may be selected from at least one of glass fiber, non-woven cloth, polyethylene, polypropylene, and polyvinylidene fluoride. The separator may be a single-layer film or a multi-layer composite film, and is not particularly limited. When the separator is a multilayer composite film, the material in each layer may be identical or different, which is not particularly limited.

In some embodiments, the positive electrode plate, the negative electrode plate, and the separator may be made into an electrode assembly by a winding process or a stacking process.

In some embodiments, the secondary battery may comprise an outer package. The outer package can be used to encapsulate the above-mentioned electrode assembly and electrolyte.

In some embodiments, the outer package of the secondary battery may be a hard case, such as a hard plastic case, an aluminum case, a steel case, and the like. The outer package of the secondary battery may also be a soft pack, such as a bag-type soft pack. The material of the soft pack may be a plastic, and examples of the plastic include polypropylene, polybutylene terephthalate and polybutylene succinate, etc.

The shape of the secondary battery is not particularly limited in the present application, and may be a cylinder, a square, or any other shape. For example, FIG. 1 shows a secondary battery 5 with a square structure as an example.

Figure 2:
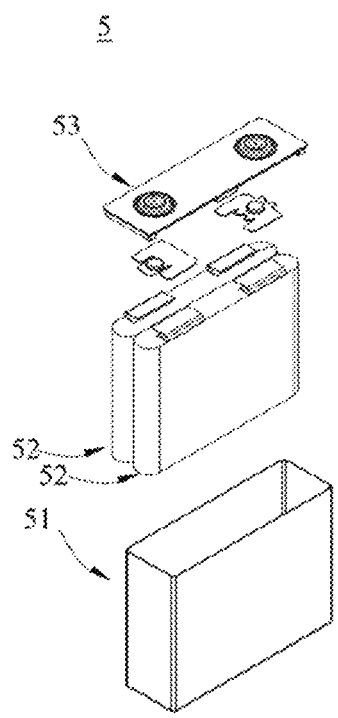
FIG. 2 is an exploded view of the secondary battery according to an embodiment of the present application shown in FIG. 1.

In some embodiments, referring to FIG. 2, the outer package may comprise a case 51 and a cover plate 53. The case 51 may comprise a bottom plate and a side plate connected to the bottom plate, which enclose to form an accommodating cavity. The case 51 has an opening that communicates with the accommodating cavity, and the cover plate 53 can cover the opening to close the accommodating cavity. The positive electrode plate, the negative electrode plate, and the separator may form an electrode assembly 52 by a winding process or a stacking process. The electrode assembly 52 is encapsulated within the accommodating cavity. The electrolyte solution impregnates the electrode assembly 52. The number of electrode assemblies 52 comprised in the secondary battery 5 may be one or more, and may be selected by those skilled in the art according to specific actual requirements.

In some embodiments, the secondary batteries may be assembled into a battery module, the number of secondary batteries comprised in the battery module may be one or more, and the specific number may be selected by those skilled in the art based on the application and capacity of the battery module.

Figure 3:
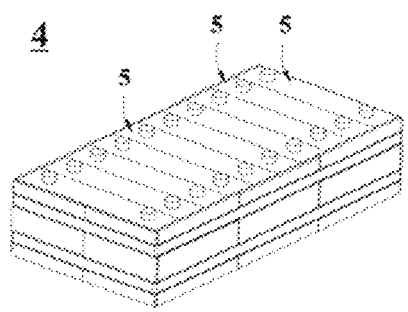
FIG. 3 is a schematic diagram of a battery module according to an embodiment of the present application.

FIG. 3 shows a battery module 4 as an example. Referring to FIG. 3, in the battery module 4, a plurality of secondary batteries 5 can be sequentially arranged along the length direction of the battery module 4. Of course, any other arrangements are also possible. The plurality of secondary batteries 5 may further be fixed by fasteners.

Optionally, the battery module 4 may further include a shell having an accommodating space, in which the plurality of secondary batteries 5 are accommodated.

In some embodiments, the battery modules may be further assembled into a battery pack, the number of battery modules comprised in the battery pack may be one or more, and the specific number may be selected by those skilled in the art based on the application and capacity of the battery pack.

Figure 4:
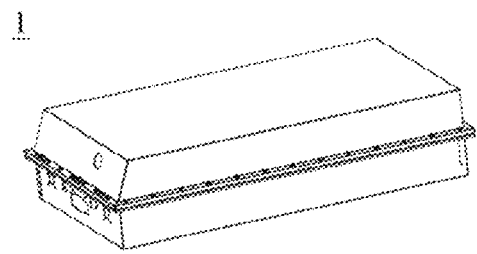
FIG. 4 is a schematic view of a battery pack according to an embodiment of the present application.
Figure 5:
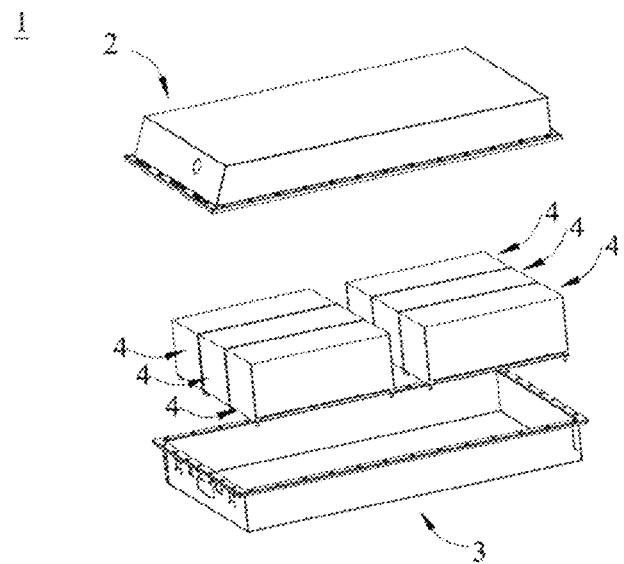
FIG. 5 is an exploded view of the battery pack according to an embodiment of the present application shown in FIG. 4.

FIG. 4 and FIG. 5 are a battery pack 1 as an example. Referring to FIG. 4 and FIG. 5, the battery pack 1 may comprise a battery box and a plurality of battery modules 4 arranged in the battery box. The battery box comprises an upper box 2 and a lower box 3, where the upper box 2 can cover the lower box 3 and forms an enclosed space for accommodating the battery module 4. The plurality of battery modules 4 may be arranged in the battery box in any manner.

In addition, the present application further provides an electrical apparatus, comprising at least one of the secondary battery, the battery module, or the battery pack provided in the present application. The secondary battery, the battery module, or the battery pack can be used as a power source for the electrical apparatus, and can also be used as an energy storage unit for the electrical apparatus. The electrical apparatus may include, but is not limited to, a mobile device (such as a mobile phone, and a laptop, etc.), an electric vehicle (such as an all-electric vehicle, a hybrid electric vehicle, a plug-in hybrid electric vehicle, an electric bicycle, an electric scooter, an electric golf cart, and an electric truck, etc.), an electric train, a ship, a satellite, and an energy storage system, etc.

For the electrical apparatus, the secondary battery, the battery module, or the battery pack may be selected according to its use requirements.

Figure 6:
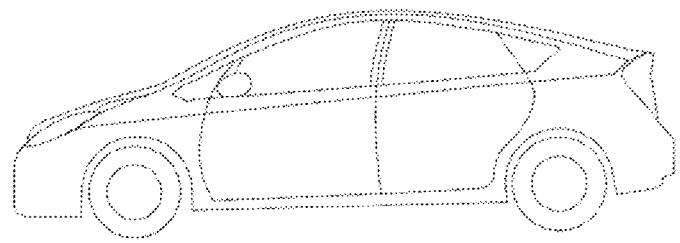
FIG. 6 is a schematic view of an electrical apparatus in which a secondary battery is used as a power source according to an embodiment of the present application.

FIG. 6 is an electrical apparatus as an example. The electrical apparatus is an all-electric vehicle, a hybrid electric vehicle, a plug-in hybrid electric vehicle, or the like. In order to meet the requirements of the electrical apparatus for high power and high energy density of secondary batteries, a battery pack or a battery module may be used.

EXAMPLES

Examples of the present application will be described hereinafter. The examples described below are illustrative, are merely used to explain the present application, and should not be construed as limitation on the present application. Where no specific techniques or conditions are specified in the examples, the techniques or conditions described in literatures of the art or the product specifications are prevailing. Where manufacturers are not specified, the employed reagents or instruments are commercially available conventional products.

The first additive is selected from compounds of:

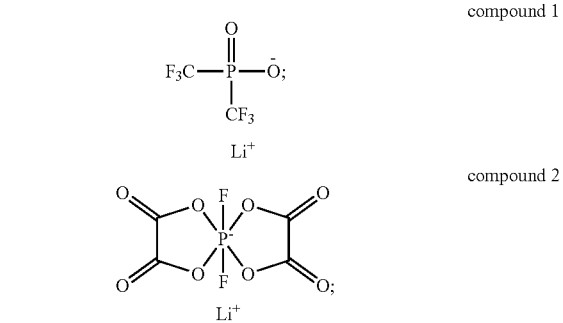

-continued

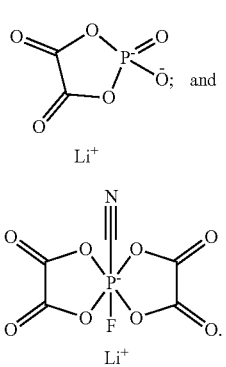

compound 3 compound 4

The second additive is selected from compounds of:

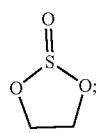

compound 5

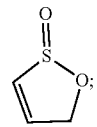

compound 6

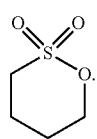

compound 7

I. Preparation of a Battery

Example 1

Step 1: Preparation of a Positive Electrode Active Material

Step S1: Preparation of manganese oxalate co-doped with Fe, Co, V, and S 689.6 g of manganese carbonate, 455.27 g of ferrous carbonate, 4.65 g of cobalt sulfate, and 4.87 g of vanadium dichloride were added into a mixer, and fully mixed for 6 h. Then, the resulting mixture was transferred into a reactor, into which 5 L of deionized water and 1260.6 g of oxalic acid dihydrate were added. The mixture was heated to 80° C., sufficiently stirred at a rotational speed of 500 rpm for 6 h, and sufficiently mixed, until the reaction terminated without bubble generation, thus providing a manganese oxalate suspension co-doped with Fe, Co, and V. Then the suspension was filtered, oven dried at 120° C., and then sanded to obtain manganese oxalate particles with a particle size of 100 nm.

Step S2: Preparation of an Inner Core $Li_{0.997}Mn_{0.60}Fe_{0.393}V_{0.004}Co_{0.003}P_{0.997}S_{0.003}O_4$ 1793.1 g of manganese oxalate prepared in (1), 368.3 g of lithium carbonate, 1146.6 g of ammonium dihydrogen phosphate and 4.9 g of dilute sulfuric acid were added into 20 L of deionized water, sufficiently stirred, and sufficiently mixed at 80° C. for 10 h to obtain a slurry. The slurry was transferred into a spray drying device for spray drying and granulation, and dried at a temperature of 250° C. to obtain a powder. In a protective atmosphere (90% nitrogen and 10% hydrogen), the powder was sintered in a roller kiln at 700° C. for 4 h to provide the above inner core material.

Step S3: Preparation of a First Cladding Layer Suspension

A $Li_2FeP_2O_7$ solution was prepared by dissolving 7.4 g of lithium carbonate, 11.6 g of ferrous carbonate, 23.0 g of ammonium dihydrogen phosphate and 12.6 g of oxalic acid dihydrate in 500 mL of deionized water, adjusting the mixture to a pH of 5, and then stirring for reaction at room temperature for 2 h to obtain the solution. Then, the solution was heated to 80° C., and maintained at this temperature for 4 h to provide the first cladding layer suspension.

Step S4: Cladding of the First Cladding Layer 1571.9 g of the doped inner core material lithium manganese phosphate obtained in step S2 was added into the first cladding layer suspension (content of cladding material: 15.7 g) obtained in step S3. The mixture was sufficiently stirred and mixed for 6 h. The sufficiently mixed mixture was transferred into a drying oven at 120° C. for drying for 6 h, and then sintered at 650° C. for 6 h to provide a pyrophosphate-cladded material.

Step S5: Preparation of a Second Cladding Layer Suspension 3.7 g of lithium carbonate, 11.6 g of ferrous carbonate, 11.5 g of ammonium dihydrogen phosphate, and 12.6 g of oxalic acid dihydrate were dissolved in 1500 mL of deionized water, and stirred for reaction for 6 h to obtain a solution. Then, the solution was heated to 120° C., and maintained at this temperature for 6 h to provide the second cladding layer suspension.

Step S6: Cladding of the Second Cladding Layer 1586.8 g of the pyrophosphate-cladded material obtained in step S4 was added into the second cladding layer suspension (content of cladding material: 47.1 g) obtained in step S5. The mixture was sufficiently stirred and mixed for 6 h. The sufficiently mixed mixture was transferred into a drying oven at 120° C. for drying for 6 h, and then sintered at 700° C. for 8 h to provide a bilayer-cladded material.

Step S7: Preparation of an Aqueous Solution of a Third Cladding Layer 37.3 g of sucrose was dissolved in 500 g of deionized water, and then stirred and fully dissolved to obtain an aqueous solution of sucrose.

Step S8: Cladding of the Third Cladding Layer 1633.9 g of the bilayer-cladded material obtained in step S6 was added into the sucrose solution obtained in step S7. The mixture was stirred and mixed for 6 h. The sufficiently mixed mixture was transferred into a drying oven at 150° C. for 6 h, and then sintered at 700° C. for 10 h to provide a trilayer-cladded material.

Step 2: Preparation of a Positive Electrode Plate

The trilayer-cladded positive electrode active material prepared above, a conductive agent acetylene black, and a binder polyvinylidene fluoride (PVDF) at a weight ratio of 97.0:1.2:1.8 were added into N-methyl pyrrolidone (NMP), and sufficiently stirred and mixed to obtain a positive electrode slurry. Then, the positive electrode slurry was uniformly coated onto an aluminum foil at 0.280 g/1540.25 mm², dried, cold pressed, and cut, to provide the positive electrode plate.

Step 3: Preparation of a Negative Electrode Plate

A negative electrode active material artificial graphite, hard carbon, the conductive agent acetylene black, a binder styrene butadiene rubber (SBR), and a thickener sodium carboxymethylcellulose (CMC) at a weight ratio of 90:5:2:2:1 were dissolved in a solvent deionized water, and sufficiently stirred and mixed to prepare a negative electrode slurry. Then, the negative electrode slurry was uniformly coated onto a negative electrode current collector copper foil at 0.117 g/1540.25 mm$^2$, dried, cold pressed, and cut, to provide the negative electrode plate.

Step 4: Preparation of an Electrolyte Solution

In a glove box under an argon atmosphere (H$_2$O<0.1 ppm, O$_2$<0.1 ppm), organic solvents ethylene carbonate (EC)/ethyl methyl carbonate (EMC) were sufficiently mixed at a volume ratio of 3/7, into which compound 1 (as a first additive at a mass content of 2% in the electrolyte solution), compound 5 (as a second additive at a mass content of 2% in the electrolyte solution), and LiPF$_6$ (as an electrolyte salt at a mass content of 1% in the electrolyte solution) were added. The mixture was sufficiently stirred to provide the electrolyte solution.

Step 5: Preparation of a Separator

A commercially available PP-PE copolymer microporous film with a thickness of 20 m and an average pore size of 80 nm (from Zoco Electronic Technology Co., Ltd., model 20) was used.

Step 6: Preparation of a Full Battery

The positive electrode plate, the separator, and the negative electrode plate prepared above were stacked in order, such that the separator was between the positive electrode and the negative electrode to serve for separation, and then winded to obtain a bare battery cell. The bare battery cell was placed in an outer package, injected with the electrolyte solution, and encapsulated, to obtain the full battery.

[Preparation of a Button-Type Battery]

The positive electrode active material prepared above, polyvinylidene fluoride (PVDF), and acetylene black at a weight ratio of 90:5:5 were added into N-methyl pyrrolidone (NMP), and stirred in a drying room to prepare a slurry. The slurry was coated onto an aluminum foil, dried, and cold pressed to form a positive electrode plate. The coating amount was 0.2 g/cm$^2$ and the compaction density was 2.0 g/cm$^3$.

A lithium sheet was used as the negative electrode, and a solution of the compound 1 (a first additive at a mass content of 2% in the electrolyte solution), the compound 5 (a second additive at a mass content of 2% in the electrolyte solution), and LiPF$_6$ (a second lithium salt at a mass content of 1% in the electrolyte solution) in a mixture of ethylene carbonate (EC), diethyl carbonate (DEC), and dimethyl carbonate (DMC) at a volume ratio of 1:1:1 was used as the electrolyte solution, which were assembled into a button-type battery together with the positive electrode plate prepared above in a button-type battery box.

Examples 2-29 and Comparative Examples 1-3

The positive electrode active materials and batteries in Examples 2-29 and Comparative Example 1-3 were prepared similar to Example 1, except for the preparation of the positive electrode active material shown in Tables 1-6, where the first cladding layer was absent in Comparative Examples 2 and 3, so that there was neither step S3 nor step S4; and the second cladding layer was absent in Comparative Example 1, so that there were no steps S5-S6.

TABLE 1

Materials for preparation of the inner core

| No. | Inner core | Raw materials used in Step S1 | Raw materials used in Step S2 |
| --- | --- | --- | --- |
| Comparative Example 1 | LiMn$_{0.80}$Fe$_{0.20}$PO$_4$ | Manganese carbonate, 919.4 g; ferrous carbonate, 231.7 g; water, 5 L; oxalic acid dihydrate, 1260.6 g | Ferromanganese oxalate dihydrate obtained in step S1 (based on C$_2$O$_4$Mn$_{0.80}$Fe$_{0.20}$•2H$_2$O), 1791.4 g; lithium carbonate, 369.4 g; ammonium dihydrogen phosphate, 1150.1 g; and water, 20 L |
| Comparative Example 2 | LiMn$_{0.70}$Fe$_{0.295}$V$_{0.005}$PO$_4$ | Manganese carbonate, 804.5 g; ferrous carbonate, 341.8 g; vanadium dichloride, 6.1 g; water, 5 L; oxalic acid dihydrate, 1260.6 g; | Vanadium iron manganese oxalate dihydrate obtained in step S1 (based on C$_2$O$_4$Mn$_{0.70}$Fe$_{0.295}$V$_{0.005}$•2H$_2$O), 1792.0 g; lithium carbonate, 369.4 g; ammonium dihydrogen phosphate, 1150.1 g; and water, 20 L |
| Comparative Example 3 | Li$_{0.997}$Mn$_{0.60}$Fe$_{0.393}$V$_{0.004}$Co$_{0.003}$P$_{0.997}$S$_{0.003}$O$_4$ | Manganese carbonate, 689.6 g; ferrous carbonate, 455.3 g; cobalt sulfate, 4.7 g; vanadium dichloride, 4.9 g; water, 5 L; oxalic acid dihydrate, 1260.6 g; | Cobalt vanadium iron manganese oxalate dihydrate obtained in step S1 (based on C$_2$O$_4$Mn$_{0.60}$Fe$_{0.393}$V$_{0.004}$Co$_{0.003}$•2H$_2$O), 1793.1 g; lithium carbonate, 368.3 g; ammonium dihydrogen phosphate, 1146.6 g; dilute sulfuric acid, 4.9 g; and water, 20 L |
| Example 11 | Li$_{1.001}$Mn$_{0.60}$Fe$_{0.393}$V$_{0.004}$Co$_{0.003}$P$_{0.999}$Si$_{0.001}$O$_4$ | Manganese carbonate, 689.6 g; ferrous carbonate, 455.3 g; cobalt sulfate, 4.7 g; vanadium dichloride, 4.9 g; water, 5 L; oxalic acid dihydrate, 1260.6 g; | Cobalt vanadium iron manganese oxalate dihydrate obtained in step S1 (based on C$_2$O$_4$Mn$_{0.60}$Fe$_{0.393}$V$_{0.004}$Co$_{0.003}$•2H$_2$O), 1793.1 g; lithium carbonate, 369.8 g; ammonium dihydrogen phosphate, 1148.9 g; silicic acid, 0.8 g; water, 20 L |

TABLE 1-continued

Materials for preparation of the inner core

| No. | Inner core | Raw materials used in Step S1 | Raw materials used in Step S2 |
|---|---|---|---|
| Example 12 | $LiMn_{0.60}Fe_{0.393}V_{0.004}Co_{0.003}P_{0.998}N_{0.002}O_4$ | Manganese carbonate, 689.6 g; ferrous carbonate, 455.3 g; cobalt sulfate, 4.7 g; vanadium dichloride, 4.9 g; water, 5 L; oxalic acid dihydrate, 1260.6 g; | Cobalt vanadium iron manganese oxalate dihydrate obtained in step S1 (based on $C_2O_4Mn_{0.60}Fe_{0.393}V_{0.004}Co_{0.003} \cdot 2H_2O$), 1793.1 g; lithium carbonate, 369.4 g; ammonium dihydrogen phosphate, 1147.8 g; dilute nitric acid, 2.7 g; water, 20 L |
| Example 13 | $Li_{0.995}Mn_{0.65}Fe_{0.341}V_{0.004}Co_{0.005}P_{0.995}S_{0.005}O_4$ | Manganese carbonate, 747.1 g; ferrous carbonate, 395.1 g; cobalt sulfate, 7.8 g; vanadium dichloride, 4.9 g; water, 5 L; oxalic acid dihydrate, 1260.6 g; | Cobalt vanadium iron manganese oxalate dihydrate obtained in step S1 (based on $C_2O_4Mn_{0.65}Fe_{0.341}V_{0.004}Co_{0.005} \cdot 2H_2O$), 1792.7 g; lithium carbonate, 367.6 g; ammonium dihydrogen phosphate, 1144.3 g; dilute sulfuric acid, 8.2 g; water, 20 L |
| Example 14 | $Li_{1.002}Mn_{0.70}Fe_{0.293}V_{0.004}Co_{0.003}P_{0.998}Si_{0.002}O_4$ | Manganese carbonate, 804.6 g; ferrous carbonate, 339.5 g; cobalt sulfate, 4.7 g; vanadium dichloride, 4.9 g; water, 5 L; oxalic acid dihydrate, 1260.6 g; | Cobalt vanadium iron manganese oxalate dihydrate obtained in step S1 (based on $C_2O_4Mn_{0.70}Fe_{0.293}V_{0.004}Co_{0.003} \cdot 2H_2O$), 1792.2 g; lithium carbonate, 370.2 g; 1147.8; silicic acid, 1.6 g; water, 20 L |
| Examples 15 and 17 | $LiMn_{0.60}Fe_{0.393}V_{0.004}Co_{0.003}P_{0.999}N_{0.001}O_4$ | Manganese carbonate, 689.6 g; ferrous carbonate, 455.3 g; cobalt sulfate, 4.7 g; vanadium dichloride, 4.9 g; water, 5 L; oxalic acid dihydrate, 1260.6 g; | Cobalt vanadium iron manganese oxalate dihydrate obtained in step S1 (based on $C_2O_4Mn_{0.60}Fe_{0.393}V_{0.004}Co_{0.003} \cdot 2H_2O$), 1793.1 g; lithium carbonate, 369.4 g; ammonium dihydrogen phosphate, 1148.9 g; dilute nitric acid, 1.4 g; water, 20 L |
| Example 16 | $Li_{0.997}Mn_{0.60}Fe_{0.393}V_{0.004}Co_{0.003}P_{0.997}S_{0.003}O_4$ | Manganese carbonate, 689.6 g; ferrous carbonate, 455.3 g; cobalt sulfate, 4.7 g; vanadium dichloride, 4.9 g; water, 5 L; oxalic acid dihydrate, 1260.6 g; | Cobalt vanadium iron manganese oxalate dihydrate obtained in step S1 (based on $C_2O_4Mn_{0.60}Fe_{0.393}V_{0.004}Co_{0.003} \cdot 2H_2O$), 1793.1 g; lithium carbonate, 368.7 g; ammonium dihydrogen phosphate, 1146.6 g; dilute sulfuric acid, 4.9 g; water, 20 L |
| Example 18 | $LiMn_{0.60}Fe_{0.393}V_{0.004}Mg_{0.003}P_{0.995}N_{0.005}O_4$ | Manganese carbonate, 689.6 g; ferrous carbonate, 455.3 g; magnesium carbonate, 2.5 g; vanadium dichloride, 4.9 g; water, 5 L; oxalic acid dihydrate, 1260.6 g; | Magnesium vanadium iron manganese oxalate dihydrate obtained in step S1 (based on $C_2O_4Mn_{0.60}Fe_{0.393}V_{0.004}Mg_{0.003} \cdot 2H_2O$), 1791.1 g; lithium carbonate, 369.4 g; ammonium dihydrogen phosphate, 1144.3 g; dilute nitric acid, 7.0 g; water, 20 L |
| Example 19 | $Li_{0.999}Mn_{0.60}Fe_{0.393}V_{0.004}Mg_{0.003}P_{0.999}S_{0.001}O_4$ | Manganese carbonate, 689.6 g; ferrous carbonate, 455.3 g; magnesium carbonate, 2.5 g; vanadium dichloride, 4.9 g; water, 5 L; oxalic acid dihydrate, 1260.6 g; | Magnesium vanadium iron manganese oxalate dihydrate obtained in step S1 (based on $C_2O_4Mn_{0.60}Fe_{0.393}V_{0.004}Mg_{0.003} \cdot 2H_2O$), 1791.1 g; lithium carbonate, 369.0 g; ammonium dihydrogen phosphate, 1148.9 g; dilute sulfuric acid, 1.6 g; water, 20 L |

TABLE 1-continued

Materials for preparation of the inner core

| No. | Inner core | Raw materials used in Step S1 | Raw materials used in Step S2 |
| --- | --- | --- | --- |
| Example 20 | $Li_{0.998}Mn_{0.60}Fe_{0.393}V_{0.004}Ni_{0.003}P_{0.998}S_{0.002}O_4$ | Manganese carbonate, 689.6 g; ferrous carbonate, 455.3 g; nickel carbonate, 3.6 g; vanadium dichloride, 4.9 g; water, 5 L; oxalic acid dihydrate, 1260.6 g; | Nickel vanadium iron manganese oxalate dihydrate obtained in step S1 (based on $C_2O_4Mn_{0.60}Fe_{0.393}V_{0.004}Ni_{0.003} \cdot 2H_2O$), 1792.2 g; lithium carbonate, 368.7 g; ammonium dihydrogen phosphate, 1147.8 g; dilute sulfuric acid, 3.2 g; water, 20 L |
| Example 21-24 | $Li_{1.001}Mn_{0.60}Fe_{0.393}V_{0.004}Ni_{0.003}P_{0.999}Si_{0.001}O_4$ | Manganese carbonate, 689.6 g; ferrous carbonate, 455.3 g; nickel carbonate, 3.6 g; vanadium dichloride, 4.9 g; water, 5 L; oxalic acid dihydrate, 1260.6 g; | Nickel vanadium iron manganese oxalate dihydrate obtained in step S1 (based on $C_2O_4Mn_{0.60}Fe_{0.393}V_{0.004}Ni_{0.003} \cdot 2H_2O$), 1793.1 g; lithium carbonate, 369.8 g; ammonium dihydrogen phosphate, 1148.9 g; silicic acid, 0.8 g; water, 20 L |
| Example 25 | $Li_{1.001}Mn_{0.50}Fe_{0.493}V_{0.004}Ni_{0.003}P_{0.999}Si_{0.001}O_4$ | Manganese carbonate, 574.7 g; ferrous carbonate, 571.2 g; nickel carbonate, 3.6 g; vanadium dichloride, 4.9 g; water, 5 L; oxalic acid dihydrate, 1260.6 g; | Nickel vanadium iron manganese oxalate dihydrate obtained in step S1 (based on $C_2O_4Mn_{0.50}Fe_{0.493}V_{0.004}Ni_{0.003} \cdot 2H_2O$), 1794.0 g; lithium carbonate, 369.8 g; ammonium dihydrogen phosphate, 1148.9 g; silicic acid, 0.8 g; water, 20 L |
| Example 26 | $Li_{1.001}Mn_{0.999}Fe_{0.001}P_{0.999}Si_{0.001}O_4$ | Manganese carbonate, 1148.2 g; ferrous carbonate, 1.2 g; water, 5 L; oxalic acid dihydrate, 1260.6 g | Ferromanganese oxalate dihydrate obtained in step S1 (based on $C_2O_4Mn_{0.999}Fe_{0.001} \cdot 2H_2O$), 1789.6 g; lithium carbonate, 369.8 g; ammonium dihydrogen phosphate, 1148.9 g; silicic acid, 0.8 g; water, 20 L |
| Example 27 | $LiMn_{0.60}Fe_{0.393}V_{0.004}Ni_{0.003}P_{0.9}N_{0.1}O_4$ | Manganese carbonate, 689.6 g; ferrous carbonate, 455.3 g; nickel carbonate, 3.6 g; vanadium dichloride, 4.9 g; water, 5 L; oxalic acid dihydrate, 1260.6 g; | Nickel vanadium iron manganese oxalate dihydrate obtained in step S1 (based on $C_2O_4Mn_{0.60}Fe_{0.393}V_{0.004}Ni_{0.003} \cdot 2H_2O$), 1793.1 g; lithium carbonate, 369.4 g; ammonium dihydrogen phosphate, 1035.1 g; dilute nitric acid, 140.0 g; water, 20 L |
| Example 28 | $Li_{1.001}Mn_{0.40}Fe_{0.593}V_{0.004}Ni_{0.003}P_{0.999}Si_{0.001}O_4$ | Manganese carbonate, 459.7 g; ferrous carbonate, 686.9 g; vanadium dichloride, 4.8 g; nickel carbonate, 3.6 g; water, 5 L; oxalic acid dihydrate, 1260.6 g | Nickel vanadium iron manganese oxalate dihydrate obtained in step S1 (based on $C_2O_4Mn_{0.40}Fe_{0.593}V_{0.004}Ni_{0.003} \cdot 2H_2O$), 1794.9 g; lithium carbonate, 369.8 g; ammonium dihydrogen phosphate, 1148.9 g; silicic acid, 0.8 g; water, 20 L |
| Example 29 | $Li_{1.001}Mn_{0.40}Fe_{0.393}V_{0.204}Ni_{0.003}P_{0.999}Si_{0.001}O_4$ | Manganese carbonate, 459.7 g; ferrous carbonate, 455.2 g; vanadium dichloride, 248.6 g; nickel carbonate, 3.6 g; water, 5 L; oxalic acid dihydrate, 1260.6 g | Nickel vanadium iron manganese oxalate dihydrate obtained in step S1 (based on $C_2O_4Mn_{0.40}Fe_{0.393}V_{0.204}Ni_{0.003} \cdot 2H_2O$), 1785.1 g; lithium carbonate, 369.8 g; ammonium dihydrogen phosphate, 1148.9 g; silicic acid, 0.8 g; water, 20 L |

TABLE 2

Preparation of first cladding layer suspension (Step S3)

| Example No.: | Cladding material of first cladding layer | Preparation of a first cladding layer suspension |
|---|---|---|
| Comparative Example 1 | Amorphous $Li_2FeP_2O_7$ | 7.4 g lithium carbonate; 11.6 g ferrous carbonate; 23.0 g ammonium dihydrogen phosphate; 12.6 g oxalic acid dihydrate; at a controlled pH of 5 |
| 13-15, and 17, and Examples 1-14, 19, and 21-29 | Crystalline $Li_2FeP_2O_7$ | 7.4 g lithium carbonate; 11.6 g ferrous carbonate; 23.0 g ammonium dihydrogen phosphate; 12.6 g oxalic acid dihydrate; pH controlled to 5 |
| Examples 15-16 | Crystalline $Al_4(P_2O_7)_3$ | 53.3 g aluminum chloride; 34.5 g ammonium dihydrogen phosphate; 18.9 g oxalic acid dihydrate; pH controlled to 4 |
| Examples 17-18 and 20 | Crystalline $Li_2NiP_2O_7$ | 7.4 g lithium carbonate; 11.9 g nickel carbonate; 23.0 g ammonium dihydrogen phosphate; 12.6 g oxalic acid dihydrate; pH controlled to 5 |

TABLE 3

Cladding of the first cladding layer (Step S4)

| No. | Cladding material and amount of first cladding layer (based on inner core weight) | Amount of inner core added in step S4 | Amount of corresponding cladding material in the first cladding layer suspension | Mixing time (h) | Drying temperature (° C.) | Sintering temperature (° C.) | Sintering time (h) |
|---|---|---|---|---|---|---|---|
| Comparative Example 1 | 2% amorphous $Li_2FeP_2O_7$ | 1570.4 g | 31.4 g | 6 | 120 | 500 | 4 |
| Examples 1-4 and 8-10 | 1% $Li_2FeP_2O_7$ | 1571.9 g | 15.7 g | 6 | 120 | 650 | 6 |
| Example 5 | 2% $Li_2FeP_2O_7$ | 1571.9 g | 31.4 g | 6 | 120 | 650 | 6 |
| Example 6 | 3% $Li_2FeP_2O_7$ | 1571.1 g | 47.1 g | 6 | 120 | 650 | 6 |
| Example 7 | 5% $Li_2FeP_2O_7$ | 1571.9 g | 78.6 g | 6 | 120 | 650 | 6 |
| Example 11 | 1% $Li_2FeP_2O_7$ | 1572.1 g | 15.7 g | 6 | 120 | 650 | 6 |
| Example 12 | 1% $Li_2FeP_2O_7$ | 1571.7 g | 15.7 g | 6 | 120 | 650 | 6 |
| Example 13 | 2% $Li_2FeP_2O_7$ | 1571.4 g | 31.4 g | 6 | 120 | 650 | 6 |
| Example 14 | 2.5% $Li_2FeP_2O_7$ | 1571.9 g | 39.3 g | 6 | 120 | 650 | 6 |
| Example 15 | 2% $Al_4(P_2O_7)_3$ | 1571.9 g | 31.4 g | 6 | 120 | 680 | 8 |
| Example 16 | 3% $Al_4(P_2O_7)_3$ | 1571.9 g | 47.2 g | 6 | 120 | 680 | 8 |
| Example 17 | 1.5% $Li_2NiP_2O_7$ | 1571.9 g | 23.6 g | 6 | 120 | 630 | 6 |
| Example 18 | 1% $Li_2NiP_2O_7$ | 1570.1 g | 15.7 g | 6 | 120 | 630 | 6 |
| Example 19 | 2% $Li_2FeP_2O_7$ | 1571.0 g | 31.4 g | 6 | 120 | 650 | 6 |
| Example 20 | 1% $Li_2NiP_2O_7$ | 1571.9 g | 15.7 g | 6 | 120 | 630 | 6 |
| Example 21-24 | 2% $Li_2FeP_2O_7$ | 1572.1 g | 31.4 g | 6 | 120 | 650 | 6 |
| Example 22 | 5.50% $Li_2FeP_2O_7$ | 1572.1 g | 86.5 g | 6 | 120 | 650 | 6 |
| Example 25 | 1% $Li_2FeP_2O_7$ | 1573.0 g | 15.7 g | 6 | 120 | 650 | 6 |
| Example 26 | 1% $Li_2FeP_2O_7$ | 1568.6 g | 15.7 g | 6 | 120 | 650 | 6 |
| Example 27 | 1% $Li_2FeP_2O_7$ | 1569.2 g | 15.7 g | 6 | 120 | 650 | 6 |
| Example 28 | 2% crystalline $Li_2FeP_2O_7$ | 1573.9 g | 31.4 g | 6 | 120 | 650 | 6 |
| Example 29 | 2% crystalline $Li_2FeP_2O_7$ | 1564.1 g | 31.2 g | 6 | 120 | 650 | 6 |

TABLE 4

Preparation of a second cladding layer suspension (Step S5)

| Example No.: | Second cladding layer material | Step S5: Preparation of a second cladding layer suspension |
|---|---|---|
| Comparative Example 3, Examples 1-14, 18-19, and 25-27 | Crystalline $LiFePO_4$ | 3.7 g lithium carbonate; 11.6 g ferrous carbonate; 11.5 g ammonium dihydrogen phosphate; 12.6 g oxalic acid dihydrate |
| Examples 15, 17, 20, 21-24, and 28-29 | Crystalline $LiCoPO_4$ | 3.7 g lithium carbonate; 15.5 g cobalt sulfate; 11.5 g ammonium dihydrogen phosphate; 12.6 g oxalic acid dihydrate |
| Example 16 | Crystalline $LiNiPO_4$ | 3.7 g lithium carbonate; 11.9 g nickel carbonate; 11.5 g ammonium dihydrogen phosphate; 12.6 g oxalic acid dihydrate |

TABLE 5

Cladding of the second cladding layer (Step S6)

| No. | Second cladding layer material and its amount (based on inner core weight) | The amount of pyrophosphate-cladded material added in Step S6 (the amount of the inner core added in Comparative Example 12) (g) | Amount of corresponding cladding material in the second cladding layer suspension (g) | Mixing time (h) | Drying temperature (° C.) | Sintering temperature (° C.) | Sintering time (h) |
|---|---|---|---|---|---|---|---|
| Comparative Example 3 | 3% $LiFePO_4$ | 1571.1 | 47.1 | 6 | 120 | 700 | 8 |
| Examples 1-4 | 3% $LiFePO_4$ | 1586.8 | 47.1 | 6 | 120 | 700 | 8 |
| Example 5 | 3% $LiFePO_4$ | 1602.5 | 47.1 | 6 | 120 | 700 | 8 |
| Example 6 | 3% $LiFePO_4$ | 1618.2 | 47.1 | 6 | 120 | 700 | 8 |
| Example 7 | 3% $LiFePO_4$ | 1649.6 | 47.1 | 6 | 120 | 700 | 8 |
| Example 8 | 1% $LiFePO_4$ | 1586.8 | 15.7 | 6 | 120 | 700 | 8 |
| Example 9 | 4% $LiFePO_4$ | 1586.8 | 62.8 | 6 | 120 | 700 | 8 |
| Example 10 | 5% $LiFePO_4$ | 1586.8 | 78.6 | 6 | 120 | 700 | 8 |
| Example 11 | 2.50% $LiFePO_4$ | 1587.8 | 39.3 | 6 | 120 | 700 | 8 |
| Example 12 | 3% $LiFePO_4$ | 1587.4 | 47.2 | 6 | 120 | 700 | 8 |
| Example 13 | 2% $LiFePO_4$ | 1602.8 | 31.4 | 6 | 120 | 700 | 8 |
| Example 14 | 3.50% $LiFePO_4$ | 1610.5 | 55.0 | 6 | 120 | 700 | 8 |
| Example 15 | 2.5% $LiCoPO_4$ | 1603.3 | 39.3 | 6 | 120 | 750 | 8 |
| Example 16 | 3% $LiNiPO_4$ | 1619.0 | 47.2 | 6 | 120 | 680 | 8 |
| Example 17 | 2.5% $LiCoPO_4$ | 1595.5 | 39.3 | 6 | 120 | 750 | 8 |
| Example 18 | 3% $LiFePO_4$ | 1585.9 | 47.1 | 6 | 120 | 700 | 8 |
| Example 19 | 4% $LiFePO_4$ | 1602.4 | 62.8 | 6 | 120 | 700 | 8 |
| Example 20 | 3% $LiCoPO_4$ | 1587.7 | 47.2 | 6 | 120 | 750 | 8 |
| Example 21 | 4% $LiCoPO_4$ | 1603.5 | 62.9 | 6 | 120 | 750 | 8 |
| Example 22 | 4% $LiCoPO_4$ | 1658.6 | 62.9 | 6 | 120 | 750 | 8 |
| Example 23 | 5.50% $LiCoPO_4$ | 1603.5 | 86.5 | 6 | 120 | 750 | 8 |
| Example 24 | 4% $LiCoPO_4$ | 1603.5 | 62.9 | 6 | 120 | 750 | 8 |
| Example 25 | 3% $LiFePO_4$ | 1588.7 | 47.2 | 6 | 120 | 700 | 8 |
| Example 26 | 3% $LiFePO_4$ | 1584.3 | 47.1 | 6 | 120 | 700 | 8 |

TABLE 5-continued

Cladding of the second cladding layer (Step S6)

| No. | Second cladding layer material and its amount (based on inner core weight) | The amount of pyrophosphate-cladded material added in Step S6 (the amount of the inner core added in Comparative Example 12) (g) | Amount of corresponding cladding material in the second cladding layer suspension (g) | Mixing time (h) | Drying temperature (° C.) | Sintering temperature (° C.) | Sintering time (h) |
|---|---|---|---|---|---|---|---|
| Example 27 | 3% LiFePO$_4$ | 1584.9 | 47.1 | 6 | 120 | 700 | 8 |
| Example 28 | 4% LiCoPO$_4$ | 1605.4 | 63.0 | 6 | 120 | 750 | 8 |
| Example 29 | 4% LiCoPO$_4$ | 1605.4 | 63.0 | 6 | 120 | 750 | 8 |

TABLE 6

Cladding of the third cladding layer (step S8)

| No. | Third cladding layer | Molar ratio of SP2 to SP3 | The amount of the bilayer-cladded material added in Step S8 (the amount of the inner core added in Comparative Examples 1-2 and 4-10, and the amount of the monolayer-cladded material added in Comparative Example 11) (g) | Amount of sucrose (g) | Mixing time (h) | Drying temperature (° C.) | Sintering temperature (° C.) | Sintering time (h) |
|---|---|---|---|---|---|---|---|---|
| Comparative Example 1 | 2% carbon | 2.7 | 1601.8 | 74.6 | 6 | 150 | 680 | 7 |
| Comparative Example 2 | 1% carbon | 2.4 | 1571.0 | 37.3 | 6 | 150 | 630 | 8 |
| Comparative Example 3 | 1% carbon | 2.1 | 1618.2 | 37.3 | 6 | 150 | 600 | 6 |
| Example 1 | 1% carbon | 2.2 | 1633.9 | 37.3 | 6 | 150 | 700 | 10 |
| Example 2 | 3% carbon | 2.3 | 1633.9 | 111.9 | 6 | 150 | 600 | 9 |
| Example 3 | 4% carbon | 2.1 | 1633.9 | 149.2 | 6 | 150 | 600 | 6 |
| Example 4 | 5% carbon | 2.4 | 1633.9 | 186.5 | 6 | 150 | 630 | 8 |
| Example 5 | 1% carbon | 2.5 | 1649.6 | 37.3 | 6 | 150 | 650 | 8 |
| Example 6 | 1% carbon | 2.5 | 1665.3 | 37.3 | 6 | 150 | 650 | 8 |
| Example 7 | 1% carbon | 2.4 | 1696.7 | 37.3 | 6 | 150 | 630 | 8 |
| Example 8 | 1% carbon | 2.3 | 1602.5 | 37.3 | 6 | 150 | 600 | 9 |
| Example 9 | 1% carbon | 2.2 | 1649.6 | 37.3 | 6 | 150 | 600 | 8 |
| Example 10 | 1% carbon | 2.2 | 1665.3 | 37.3 | 6 | 150 | 600 | 9 |
| Example 11 | 1.5% carbon | 2.3 | 1629.0 | 56.1 | 6 | 150 | 600 | 9 |
| Example 12 | 2% carbon | 2.4 | 1634.6 | 74.7 | 6 | 150 | 630 | 8 |
| Example 13 | 2% carbon | 2.5 | 1634.2 | 74.6 | 6 | 150 | 650 | 8 |
| Example 14 | 2.5% carbon | 2.7 | 1665.5 | 93.3 | 6 | 150 | 680 | 7 |
| Example 15 | 2% carbon | 2.8 | 1642.6 | 74.7 | 6 | 150 | 680 | 8 |
| Example 16 | 1% carbon | 2.7 | 1666.2 | 37.3 | 6 | 150 | 680 | 7 |
| Example 17 | 1.5% carbon | 2.3 | 1634.8 | 56.0 | 6 | 150 | 600 | 9 |
| Example 18 | 1% carbon | 2.6 | 1633.0 | 37.3 | 6 | 150 | 650 | 7 |

TABLE 6-continued

Cladding of the third cladding layer (step S8)

| | Third cladding layer | Molar ratio of SP2 to SP3 | The amount of the bilayer-cladded material added in Step S8 (the amount of the inner core added in Comparative Examples 1-2 and 4-10, and the amount of the monolayer-cladded material added in Comparative Example 11) (g) | Step S8: cladding of the third cladding layer | | | | |
|---|---|---|---|---|---|---|---|---|
| | | | | Amount of sucrose (g) | Mixing time (h) | Drying temperature (° C.) | Sintering temperature (° C.) | Sintering time (h) |
| Example 19 | 1.5% carbon | 2.4 | 1665.2 | 56.0 | 6 | 150 | 630 | 8 |
| Example 20 | 1.5% carbon | 2.2 | 1634.8 | 56.0 | 6 | 150 | 600 | 9 |
| Example 21 | 1% carbon | 2.2 | 1666.4 | 37.3 | 6 | 150 | 600 | 9 |
| Example 22 | 1% carbon | 2.3 | 1721.4 | 37.3 | 6 | 150 | 600 | 9 |
| Example 23 | 1% carbon | 2.4 | 1690.0 | 37.3 | 6 | 150 | 630 | 8 |
| Example 24 | 5.5% carbon | 2.6 | 1666.4 | 205.4 | 6 | 150 | 650 | 7 |
| Example 25 | 1% carbon | 2.4 | 1635.9 | 37.4 | 6 | 150 | 630 | 8 |
| Example 26 | 1% carbon | 2.3 | 1631.3 | 37.3 | 6 | 150 | 600 | 9 |
| Example 27 | 1.5% carbon | 2.1 | 1631.9 | 55.9 | 6 | 150 | 600 | 6 |
| Example 28 | 1% carbon | 0.07 | 1668.3 | 37.4 | 6 | 80 | 600 | 6 |
| Example 29 | 1% carbon | 13 | 1668.3 | 37.4 | 6 | 150 | 850 | 10 |

II. Performance Evaluation

1. Test Method of Lattice Change Rate:

In an environment at a constant temperature of 25° C., a positive electrode active material sample was placed in an XRD (model Bruker D8 Discover), and tested at 1°/min. The test data was sorted and analyzed, to compute current lattice constants aG, b0, c0, and v0 (aG, b0, and corepresent length sizes of unit cells in all aspects with reference to standard PDF cards, and v0 represents the unit cell volume, and can be directly obtained based on XRD refinement results).

The positive electrode active material sample was prepared into a button-type battery using the method for preparing a button-type battery in the above examples, and the button-type battery was charged at a small rate of 0.05 C, until the current decreased to 0.01 C. Then, the positive electrode plate in the button-type battery was taken out, soaked in dimethyl carbonate (DMC) for 8 h, and then dried. The powder was scraped, and particles with a particle size of less than 500 nm were selected. A sample was taken and the unit cell volume vi was calculated in the same way as the fresh sample tested above. The lattice change rate (unit cell volume change rate) before and after complete deintercalation of lithium was calculated as per (v0-v1)/v0×100%, as shown in the table.

2. Li/Mn Antisite Defect Concentration

The Li/Mn antisite defect concentration was obtained by comparing the XRD results tested in the "Lattice Change Rate Measurement Method" with the PDF (Powder Diffraction File) card of a standard crystal. Specifically, the XRD results tested in the "Lattice Change Rate Measurement Method" were imported into the General Structural Analysis System (GSAS) software, and the refined results were automatically obtained, which included the occupancy of different atoms. and the Li/Mn antisite defect concentration was obtained by reading the refined results.

3. Compaction Density 5 g of the above-prepared positive electrode active material powder was placed in a special compaction mold (CARVER mold, 13 mm), and then the mold was placed on a compaction density test instrument. A pressure of 3 T was applied, the thickness of the powder under pressure (thickness after pressure relief) was read on the device, and the compaction density was calculated by p=m/v, where the area used is the standard small picture area of 1540.25 mm$^2$.

4. Capacity Rate of Constant Current Charged at 3 C

In an environment at a constant temperature of 25° C., fresh full batteries in the above examples and comparative examples were left to stand for 5 min, discharged to 2.5V at 1/3 C, left to stand for 5 min, charged to 4.3V at 1/3 C, then charged to a current of less than or equal to 0.05 mA at a constant voltage of 4.3V, left to stand for 5 min, with the charging capacity at this time denoted as C0, discharged to 2.5V at 1/3 C, left to stand for 5 min, then charged to 4.3V at 3 C and left to stand for 5 min, with the charging capacity at this time denoted as C1. The capacity rate of constant current charged at 3 C was C1/C0×100%.

The higher the capacity rate of constant current charged at 3 C is, the better the rate performance of the secondary battery will be.

5. Dissolution Test of Transition Metal Mn (and Fe Doped at the Position of Mn)

The full batteries prepared in the above examples and comparative examples that were cycled at 45° C. until the capacity was attenuated to 80% were discharged to a cut-off voltage of 2.0V at a rate of 0.1 C. Then, the battery was disassembled to take out the negative electrode plate, and 30 wafers of unit area (1540.25 mm$^2$) were taken on the negative electrode plate, to test the inductively coupled plasma emission spectrometry (ICP) using Agilent ICP- OES730. According to the ICP results, the amounts of Fe (if Fe was doped at a position of Mn of the positive electrode active material) and Mn were computed to compute the dissolution amount of Mn (and Fe of Mn site doped) after cycling. The test standard is based on EPA-6010D-2014.

6. Surface Oxygen Valence State 5 g of the above-prepared positive electrode active material sample was prepared into a button-type battery according to the button-type battery preparation method described in the above example. The button-type battery was charged at a small rate of 0.05 C until the current decreased to 0.01 C. Then, the positive electrode plate in the button-type battery was taken out, soaked in DMC for 8 h. and then dried. The powder was scraped, and particles with a particle size of less than 500 nm were selected. The resulting particles were measured using electron energy loss spectroscopy (EELS, model: Talos F200S) to obtain an energy loss near edge structure (ELNES), which reflects the state density and energy level distribution of elements. Based on the state density and energy level distribution, the valence band state density was integrated to compute the number of occupied electrons, thereby inferring the surface oxygen valence state after charging.

7. Measurement of Elements Manganese and Phosphorus in Positive Electrode Active Materials 5 g of the above-prepared positive electrode active material was dissolved in 100 ml of inverse aqua regia (concentrated hydrochloric acid: concentrated nitric acid=1:3) (concentration of concentrated hydrochloric acid: about 37%, concentration of concentrated nitric acid: about 65%), and ICP was used to test the contents of the elements in the solution. The content of the element manganese or phosphorus was measured and converted (the amount of the element manganese or phosphorus/the amount of the positive electrode active material*100%) to obtain its weight proportion.

8. Method for Measuring an Initial Gram Capacity of the Button-Type Battery

At 2.5-4.3V, the button-type batteries in the above examples and comparative examples were charged to 4.3V at 0.1 C, then charged to a current of less than or equal to 0.05 mA at a constant voltage of 4.3V, left to stand for 5 min, and then discharged to 2.0V at 0.1 C. The discharge capacity at this time was the initial gram capacity, and was denoted as D0.

10. Battery Cell Expansion Test of Full Battery Stored at 60° C. for 30 Days:

The full batteries prepared in the above examples and comparative examples were stored at 100% state of charge (SOC) at 60° C. The open-circuit voltage (OCV) and AC internal impedance (IMP) of the battery cell were measured before, during, and after storage, to monitor the SOC, and measure the battery cell volume. The full batteries were taken out every 48 h after storage, and left to stand for 1 h, to test the open-circuit voltage (OCV) and internal impedance (IMP), and measure the battery cell volume by water displacement after cooling to room temperature. The water displacement means to first separately measure the battery cell gravity $F_1$ with a balance that automatically performs unit conversion of dial data, then place the battery cell completely in deionized water (density is known to be 1 g/cm$^3$) to measure the battery cell gravity $F_2$ at this time, where the battery cell is subjected to buoyance $F_{buoyance}=F_1-F_2$, and then compute, according to the Archimedes' principle of $F_{buoyancy}=\Sigma \times g \times V_{displacement}$, the battery cell volume $V=(F_1-F_2)/(\rho \times g)$.

As can be seen from the OCV and IMP test results, the batteries in all examples remain above 99% SOC throughout the test until the storage was complete.

After 30 days of storage, the battery cell volume was measured and the percentage increase in the battery cell volume after storage relative to the battery cell volume before storage was calculated.

11. Cycling Performance Test of the Full Battery at 45° C.

In an environment at a constant temperature of 45° C., at 2.5-4.3V, the battery was charged to 4.3V at 1 C, then charged at a constant voltage of 4.3V until the current was <0.05 mA. The battery was let stand for 5 min, and then discharged to 2.5V at 1 C. The capacity was denoted as D. (n=0,1,2, . . . ). The foregoing process was repeated until the capacity was fading to 80%, and the number of cycles at this time was recorded, which was the cycle number corresponding to 80% of capacity retention rate at 45° C.

12. Interplanar Spacing and Angle Test 1 g of the positive electrode active material powder prepared above was transferred into a 50 mL test tube, 10 mL of 75% (mass fraction) alcohol was injected into the test tube, and then the mixture was stirred fully to disperse the powder for 30 min. Then an appropriate amount of the solution was added dropwise onto a 300-mesh copper screen with a clean disposable plastic pipette. At this time, some of the powder remained on the copper screen. The copper screen was transferred into a sample cavity of a TEM (Talos F200s G2) together with the sample for testing, to obtain an original TEM image, which was saved in a format of xx.dm3.

The original image obtained from the TEM test was opened in the DigitalMicrograph software, to obtain a diffraction pattern by Fourier transform (automatically completed by the software after a clicking operation). A distance from a diffraction spot to a center position in the diffraction pattern was measured to obtain the interplanar spacing, and the angle was calculated according to the Bragg equation.

By comparing the obtained interplanar spacing and corresponding angle data with their standard values, different substances in the cladding layer can be identified. 13. Cladding layer thickness test The thickness of the cladding layer was tested by cutting a thin slice with a thickness of about 100 nm by FIB from a middle part of a single particle of the positive electrode active material prepared above, and then the thin slice was tested under a TEM to obtain an original TEM image, which was saved in a format of xx.dm3.

The original image obtained from the above TEM test was opened in the DigitalMicrograph software, the cladding layer was identified according to the lattice spacing and angle information, and the thickness of the cladding layer was measured.

Thicknesses at three locations were measured on the selected particles and averaged. 14. Determination of molar ratio of SP2 hybridized carbon to SP3 hybridized carbon in the third cladding layer This test was performed by Raman spectroscopy. The spectrum of the Raman test was split, to obtain Id/Ig, where Id was the peak intensity of the SP3 hybridized carbon, and Ig was the peak intensity of the SP2 hybridized carbon, thereby determining the molar ratio of the two.

The performance test results for all examples and comparative examples are shown in the table below.

TABLE 7

Powder performances of positive electrode active materials in Examples 1-29 and Comparative Examples 1-3 and battery performances of the resulting batteries

| | Performances of positive electrode active material powder | | | | | | Battery performance | | |
|---|---|---|---|---|---|---|---|---|---|
| Example No.: | Lattice change rate (%) | Li/Mn antisite defect concentration (%) | Compaction density (g/cm$^3$) | Surface oxygen valence state | Capacity rate of constant current charged at 3 C (%) | Dissolution of Mn and Fe after cycling (ppm) | Capacity of button-type battery at 0.1 C (mAh/g) | Battery cell expansion (%) after storage at 60° C. for 30 d | Cycle number for 80% of capacity retention rate at 45° C. |
| Comparative Example 1 | 10.8 | 3.4 | 1.64 | −1.64 | 54 | 503 | 145.2 | 25.4 | 421 |
| Comparative Example 2 | 4.3 | 2.8 | 1.69 | −1.82 | 59 | 379 | 152.4 | 4.3 | 652 |
| Comparative Example 3 | 2.3 | 2.1 | 1.95 | −1.95 | 52 | 634 | 131.5 | 28.7 | 201 |
| Example 1 | 2.5 | 1.8 | 2.35 | −1.93 | 73 | 4 | 157.9 | 1.9 | 1201 |
| Example 2 | 2.5 | 1.8 | 2.24 | −1.94 | 73 | 4 | 156.8 | 2.1 | 1259 |
| Example 3 | 2.5 | 1.8 | 2.22 | −1.94 | 73 | 4 | 155.7 | 1.7 | 1398 |
| Example 4 | 2.5 | 1.8 | 2.21 | −1.95 | 73 | 3 | 154.7 | 1.4 | 1431 |
| Example 5 | 2.5 | 1.8 | 2.33 | −1.93 | 73 | 4 | 157.1 | 1.5 | 1569 |
| Example 6 | 2.5 | 1.8 | 2.31 | −1.93 | 72 | 3 | 156.7 | 2.2 | 1581 |
| Example 7 | 2.5 | 1.8 | 2.28 | −1.93 | 71 | 3 | 156.1 | 1.8 | 1675 |
| Example 8 | 2.5 | 1.8 | 2.29 | −1.93 | 72 | 6 | 156.9 | 2.5 | 1123 |
| Example 9 | 2.5 | 1.8 | 2.46 | −1.98 | 76 | 4 | 157.9 | 1.8 | 1327 |
| Example 10 | 2.5 | 1.8 | 2.49 | −1.98 | 78 | 4 | 157.9 | 1.7 | 1541 |
| Example 11 | 2.6 | 1.9 | 2.38 | −1.97 | 75 | 5 | 157.7 | 2.2 | 1134 |
| Example 12 | 2.4 | 1.8 | 2.41 | −1.97 | 77 | 3 | 156.7 | 1.7 | 1189 |
| Example 13 | 2.7 | 1.9 | 2.42 | −1.97 | 78 | 4 | 157.1 | 1.4 | 1231 |
| Example 14 | 2.8 | 1.9 | 2.45 | −1.97 | 80 | 3 | 156.8 | 1.7 | 1432 |
| Example 15 | 2.2 | 1.9 | 2.46 | −1.97 | 77 | 3 | 157.8 | 1.8 | 1259 |
| Example 16 | 2.1 | 1.9 | 2.47 | −1.98 | 76 | 4 | 156.2 | 2.1 | 1254 |
| Example 17 | 2.5 | 1.7 | 2.41 | −1.98 | 78 | 3 | 156.4 | 3 | 1321 |
| Example 18 | 2.3 | 1.6 | 2.42 | −1.97 | 79 | 3 | 157.3 | 2.7 | 1345 |
| Example 19 | 2.2 | 1.7 | 2.43 | −1.97 | 80 | 4 | 155.3 | 2.5 | 1376 |
| Example 20 | 2.6 | 1.8 | 2.42 | −1.94 | 78 | 2 | 156.9 | 1.5 | 1537 |
| Example 21 | 2.4 | 1.7 | 2.41 | −1.97 | 79 | 3 | 156.5 | 1.7 | 1401 |
| Example 22 | 2.4 | 1.8 | 2.32 | −1.95 | 75 | 2 | 156.1 | 1.1 | 1598 |
| Example 23 | 2.3 | 1.7 | 2.46 | −1.96 | 79 | 3 | 154.3 | 1.3 | 1689 |
| Example 24 | 2.2 | 1.8 | 2.47 | −1.95 | 79 | 2 | 155.1 | 1.4 | 1601 |
| Example 25 | 2.1 | 1.7 | 2.49 | −1.98 | 82 | 3 | 158.7 | 2.1 | 1585 |
| Example 26 | 3.6 | 2.5 | 2.21 | −1.97 | 59 | 6 | 156.3 | 3.1 | 1231 |
| Example 27 | 2.8 | 2.1 | 2.24 | −1.98 | 77 | 4 | 156.4 | 1.8 | 1187 |
| Example 28 | 2.5 | 1.9 | 1.95 | −1.94 | 57 | 6 | 156.2 | 3.5 | 1032 |
| Example 29 | 2.4 | 1.8 | 1.98 | −1.95 | 71 | 7 | 156.7 | 2.55 | 1131 |

As can be seen from Table 7, a smaller lattice change rate, a smaller antisite defect concentration of Li/Mn, a larger compaction density, a surface oxygen valence state closer to −2, less Mn and Fe dissolution after cycling, and better battery performance, such as better high-temperature storage performance and high-temperature cycling performance, are achieved in the examples, compared with the comparative examples.

TABLE 8

Thickness of each layer and weight ratio of element manganese to element phosphorus of positive electrode active materials prepared in Examples 1-14 and Comparative Examples 1-3

| No. | Inner core | First cladding layer | Second cladding layer | Third cladding layer | First cladding layer thickness (nm) | Second cladding layer thickness (nm) | Third cladding layer thickness (nm) | Content of element Mn (wt %) | Weight ratio of element Mn to element P |
|---|---|---|---|---|---|---|---|---|---|
| Comparative Example 1 | $LiMn_{0.80}Fe_{0.20}PO_4$ | 2% amorphous $Li_2FeP_2O_7$ | — | 2% carbon | 4 | — | 10 | 26.1 | 1.383 |
| Comparative Example 2 | $LiMn_{0.70}Fe_{0.295}V_{0.005}PO_4$ | — | — | 1% carbon | — | — | 5 | 24.3 | 1.241 |
| Comparative Example 3 | $Li_{0.999}Mn_{0.60}Fe_{0.393}V_{0.004}Co_{0.003}P_{0.999}S_{0.001}O_4$ | — | 3% crystalline $LiFePO_4$ | 1% carbon | — | 7.5 | 5 | 19.6 | 1.034 |
| Example 1 | $Li_{0.997}Mn_{0.60}Fe_{0.393}V_{0.004}Co_{0.003}P_{0.997}S_{0.003}O_4$ | 1% $Li_2FeP_2O_7$ | 3% $LiFePO_4$ | 1% carbon | 2 | 7.5 | 5 | 19.0 | 1.023 |

TABLE 8-continued

Thickness of each layer and weight ratio of element manganese to element phosphorus of positive electrode active materials prepared in Examples 1-14 and Comparative Examples 1-3

| No. | Inner core | First cladding layer | Second cladding layer | Third cladding layer | First cladding layer thickness (nm) | Second cladding layer thickness (nm) | Third cladding layer thickness (nm) | Content of element Mn (wt %) | Weight ratio of element Mn to element P |
|---|---|---|---|---|---|---|---|---|---|
| Example 2 | $Li_{0.997}Mn_{0.60}Fe_{0.393}V_{0.004}Co_{0.003}P_{0.997}S_{0.003}O_4$ | 1% $Li_2FeP_2O_7$ | 3% $LiFePO_4$ | 3% carbon | 2 | 7.5 | 15 | 18.3 | 1.023 |
| Example 3 | $Li_{0.997}Mn_{0.60}Fe_{0.393}V_{0.004}Co_{0.003}P_{0.997}S_{0.003}O_4$ | 1% $Li_2FeP_2O_7$ | 3% $LiFePO_4$ | 4% carbon | 2 | 7.5 | 20 | 18.0 | 1.023 |
| Example 4 | $Li_{0.997}Mn_{0.60}Fe_{0.393}V_{0.004}Co_{0.003}P_{0.997}S_{0.003}O_4$ | 1% $Li_2FeP_2O_7$ | 3% $LiFePO_4$ | 5% carbon | 2 | 7.5 | 25 | 17.9 | 1.023 |
| Example 5 | $Li_{0.997}Mn_{0.60}Fe_{0.393}V_{0.004}Co_{0.003}P_{0.997}S_{0.003}O_4$ | 2% $Li_2FeP_2O_7$ | 3% $LiFePO_4$ | 1% carbon | 4 | 7.5 | 5 | 18.7 | 1.011 |
| Example 6 | $Li_{0.997}Mn_{0.60}Fe_{0.393}V_{0.004}Co_{0.003}P_{0.997}S_{0.003}O_4$ | 3% $Li_2FeP_2O_7$ | 3% $LiFePO_4$ | 1% carbon | 6 | 7.5 | 5 | 18.3 | 0.999 |
| Example 7 | $Li_{0.997}Mn_{0.60}Fe_{0.393}V_{0.004}Co_{0.003}P_{0.997}S_{0.003}O_4$ | 5% $Li_2FeP_2O_7$ | 3% $LiFePO_4$ | 1% carbon | 10 | 7.5 | 5 | 17.6 | 0.975 |
| Example 8 | $Li_{0.997}Mn_{0.60}Fe_{0.393}V_{0.004}Co_{0.003}P_{0.997}S_{0.003}O_4$ | 1% $Li_2FeP_2O_7$ | 1% $LiFePO_4$ | 1% carbon | 2 | 2.5 | 5 | 19.8 | 1.043 |
| Example 9 | $Li_{0.997}Mn_{0.60}Fe_{0.393}V_{0.004}Co_{0.003}P_{0.997}S_{0.003}O_4$ | 1% $Li_2FeP_2O_7$ | 4% $LiFePO_4$ | 1% carbon | 2 | 10 | 5 | 18.7 | 1.014 |
| Example 10 | $Li_{0.997}Mn_{0.60}Fe_{0.393}V_{0.004}Co_{0.003}P_{0.997}S_{0.003}O_4$ | 1% $Li_2FeP_2O_7$ | 5% $LiFePO_4$ | 1% carbon | 2 | 12.5 | 5 | 18.4 | 1.004 |
| Example 11 | $Li_{1.001}Mn_{0.60}Fe_{0.393}V_{0.004}Co_{0.003}P_{0.999}Si_{0.001}O_4$ | 1% $Li_2FeP_2O_7$ | 2.50% $LiFePO_4$ | 1.5% carbon | 2 | 6.3 | 7.5 | 19.0 | 1.026 |
| Example 13 | $Li_{0.995}Mn_{0.65}Fe_{0.341}V_{0.004}Co_{0.005}P_{0.995}S_{0.005}O_4$ | 2% $Li_2FeP_2O_7$ | 2% $LiFePO_4$ | 2% carbon | 4 | 5 | 10 | 18.7 | 1.108 |
| Example 14 | $Li_{1.002}Mn_{0.70}Fe_{0.293}V_{0.004}Co_{0.003}P_{0.998}Si_{0.002}O_4$ | 2.5% $Li_2FeP_2O_7$ | 3.50% $LiFePO_4$ | 2.5% carbon | 5 | 8.8 | 12.5 | 17.8 | 1.166 |

As can be seen from Table 8, by doping at the positions of manganese and phosphorus and trilayer cladding of lithium iron manganese phosphate (manganese content: 35%, phosphorus content: about 20%), the content of element manganese and the weight ratio of element manganese to element phosphorus in the positive electrode active material are obviously reduced. In addition, by comparing Examples 1-14 with Comparative Example 1, Comparative Example 2, and Comparative Example 3, as can be seen from Table 7, the reduction of elements manganese and phosphorus in the positive electrode active material will lead to a decrease in the dissolution of manganese and iron and an improvement in the battery performance of the secondary battery prepared therefrom.

Examples 30-64

The positive electrode active materials, button-type batteries, and full batteries were prepared in the same manner as those in Example 6, except that the electrolyte solution composition was changed, specifically as shown in Table 9 below.

Further, the performance data was measured for the button-type batteries or the full batteries in Examples 30-64 according to the above performance test, as shown in Table 10.

TABLE 9

Electrolyte solution composition

| Example No.: | First additive | Content W1 (%) | Second additive | Content W2 (%) | Value M of W1/W2 | Electrolyte salt | Electrolyte salt content (M) | Value C of W1/(C1 + C2 + C3) |
|---|---|---|---|---|---|---|---|---|
| 30 | Same as Example 6 | 0.1 | Same as Example 6 | | 0.05 | Same as Example 6 | | 0.014 |
| 31 | | 5 | | | 2.5 | | | 0.71 |
| 32 | | 3 | | | 1.5 | | | 0.43 |
| 33 | | 10 | | | 5 | | | 1.43 |
| 34 | | 0.005 | | | 0.0025 | | | 0.00 |
| 35 | | 20 | | | 10 | | | 2.86 |
| 36 | | 0.001 | | | 0.0005 | | | 0.00 |
| 37 | | 25 | | | 12.5 | | | 3.57 |
| 38 | Same as Example 6 | | | 0.1 | 20 | Same as Example 6 | | 0.29 |
| 39 | | | | 10 | 0.2 | | | 0.29 |
| 40 | | | | 5 | 0.4 | | | 0.29 |
| 41 | | | | 15 | 0.13 | | | 0.29 |
| 42 | | | | 0.005 | 400 | | | 0.29 |
| 43 | | | | 20 | 0.1 | | | 0.29 |
| 44 | | 0.1 | | 0.01 | 10 | Same as Example 6 | | 0.014 |

TABLE 9-continued

| Example No.: | First additive | Content W1 (%) | Second additive | Content W2 (%) | Value M of W1/W2 | Electrolyte salt | Electrolyte salt content (M) | Value C of W1/(C1 + C2 + C3) |
|---|---|---|---|---|---|---|---|---|
| 45 | | 0.005 | | 0.001 | 5 | | | 0.00 |
| 46 | | | Same as Example 6 | | | | 0.8 | Same as |
| 47 | | | | | | | 2 | Example 6 |
| 48 | | | | | | | 0.5 | |
| 49 | | | | | | | 2.5 | |
| 50 | | | | | | | 0.3 | |
| 51 | | | | | | | 1.5 | |
| 52 | Same as | 0.1 | Same as | 10 | 0.001 | Same as | Same as | −1.44 |
| 53 | Example 6 | 2 | Example 6 | 0.04 | 50 | Example 6 | Example 6 | 0.29 |
| 54 | | 7 | | 2 | 3.5 | | Same as | 1 |
| 55 | | 14. | | 2 | 7 | | Example 6 | 2 |
| 56 | | 0.007 | | 2 | 0.0035 | | | 0.001 |
| 57 | | 0.07 | | 2 | 0.035 | | | 0.01 |
| 58 | Compound 2 | | Same as Example 6 | | | | | Same as |
| 59 | Compound 3 | | | | | | | Example 6 |
| 60 | Compound 4 | | | | | | | |
| 61% | Same as Example 6 | | Compound 6 | | | Same as Example 6 | | Same as |
| 62 | | | Compound 7 | | | | | Example 6 |
| 63 | | | Same as Example 6 | | | LiFSI | Same as | Same as |
| 64 | | | | | | LiTFSI | Example 6 | Example 6 |

TABLE 10

Performance data measured for the positive electrode active materials, the button-type batteries, or the full batteries in Examples 30-64 according to the above performance test

| Examples | Dissolution of Mn and Fe after cycling (ppm) | Capacity of button-type battery at 0.1 C (mAh/g) | Battery cell expansion (%) after storage at 60° C. for 30 d | Cycle number for 80% of capacity retention rate (%) at 45° C. |
|---|---|---|---|---|
| Example 30 | 3 | 153.9 | 2.5 | 1417 |
| Example 31 | 2 | 157.2 | 1.2 | 1497 |
| Example 32 | 2 | 156.9 | 1.4 | 1482 |
| Example 33 | 2 | 155.9 | 2.1 | 1423 |
| Example 34 | 3 | 153.7 | 2.7 | 1421 |
| Example 35 | 2 | 156.1 | 1.3 | 1476 |
| Example 36 | 3 | 152.7 | 2.6 | 1382 |
| Example 37 | 2 | 151.9 | 1.8 | 1341 |
| Example 38 | 3 | 155.1 | 2.3 | 1427 |
| Example 39 | 2 | 155.9 | 1.7 | 1437 |
| Example 40 | 2 | 156.1 | 1.1 | 1445 |
| Example 41 | 2 | 155.9 | 0.9 | 1487 |
| Example 42 | 3 | 154.7 | 2.4 | 1390 |
| Example 43 | 2 | 155.3 | 0.8 | 1371 |
| Example 44 | 3 | 153.6 | 2.6 | 1401 |
| Example 45 | 3 | 153.1 | 2.7 | 1397 |
| Example 46 | 3 | 155.7 | 1.1 | 1452 |
| Example 47 | 3 | 156.1 | 1.3 | 1476 |
| Example 48 | 3 | 145.7 | 2.5 | 1378 |
| Example 49 | 3 | 154.9 | 1.7 | 1412 |
| Example 50 | 3 | 132.1 | 2.5 | 1231 |
| Example 51 | 3 | 155.6 | 1.8 | 1458 |
| Example 52 | 3 | 155.1 | 2.1 | 1442 |
| Example 53 | 2 | 154.2 | 1.6 | 1437 |
| Example 54 | 3 | 156 | 0.8 | 1467 |
| Example 55 | 2 | 156.3 | 0.7 | 1487 |
| Example 56 | 3 | 154.2 | 1.6 | 1437 |
| Example 57 | 3 | 155.3 | 0.9 | 1468 |
| Example 58 | 2 | 155.9 | 1.2 | 1457 |
| Example 59 | 3 | 156.7 | 1.5 | 1480 |
| Example 60 | 5 | 155.3 | 1.6 | 1330 |
| Example 61 | 3 | 155.7 | 1.1 | 1462 |
| Example 62 | 3 | 156.3 | 0.9 | 1473 |
| Example 63 | 3 | 156.1 | 1.3 | 1467 |
| Example 64 | 3 | 155.9 | 1.2 | 1473 |

The electrolyte solutions in the full batteries of the above Examples 1-29 were replaced with: an electrolyte solution obtained by sufficiently mixing organic solvents ethylene carbonate (EC)/ethyl methyl carbonate (EMC) at a volume ratio of 3/7, dissolving 12.5 wt % (based on weight of the solvents ethylene carbonate/ethyl methyl carbonate) LiPF$_6$ in the organic solvents, and sufficiently stirring the mixture; and the electrolyte solutions in the button-type batteries were replaced with an electrolyte solution which was a solution of 1 mol/L LiPF$_6$ in ethylene carbonate (EC), diethyl carbonate (DEC), and dimethyl carbonate (DMC) at a volume ratio 1:1:1. The dissolution of Mn and Fe (ppm) after cycling, capacity of the button-type batteries at 0.1 C (mAh/g), capacity rate of constant current charged at 3 C (%), cycle number for 80% of capacity retention rate at 45° C., and battery cell expansion rate (%) after storage at 60° C. of the button-type batteries or the full batteries formed in Comparative Examples 4-32 were tested according to the above methods, and the test results were recorded in Table 11.

TABLE 11

| Comparative Example No. | Capacity rate of constant current charged at 3 C (%) | Dissolution of Mn and Fe after cycling (ppm) | Capacity of button-type battery at 0.1 C (mAh/g) | Battery cell expansion (%) after storage at 60° C. for 30 d | Cycle number for 80% of capacity retention rate at 45° C. |
|---|---|---|---|---|---|
| Comparative Example 4 | 70.3 | 7 | 157.2 | 4.2 | 1128 |
| Comparative Example 5 | 70.2 | 6 | 156.3 | 3.7 | 1253 |
| Comparative Example 6 | 70.1 | 5 | 155.4 | 3.4 | 1374 |
| Comparative Example 7 | 70.2 | 3 | 153.7 | 2.9 | 1406 |
| Comparative Example 8 | 70.1 | 5 | 156.7 | 3.1 | 1501 |
| Comparative Example 9 | 69.7 | 4 | 156.2 | 2.8 | 1576 |
| Comparative Example 10 | 68.4 | 3 | 155.8 | 2.5 | 1647 |
| Comparative Example 11 | 69.1 | 9 | 156.4 | 3.4 | 1058 |
| Comparative Example 12 | 73.4 | 6 | 157.6 | 2.9 | 1286 |
| Comparative Example 13 | 75.4 | 5 | 157.8 | 2.5 | 1486 |
| Comparative Example 14 | 72.4 | 6 | 157.3 | 3.5 | 1026 |
| Comparative Example 15 | 74.5 | 4 | 156.3 | 2.5 | 1136 |
| Comparative Example 16 | 75.3 | 5 | 156.6 | 3.5 | 1207 |
| Comparative Example 17 | 76.5 | 3 | 153.8 | 3.7 | 1308 |
| Comparative Example 18 | 74.3 | 3 | 153.8 | 3.7 | 1109 |
| Comparative Example 19 | 73.1 | 5 | 154.2 | 3.8 | 1132 |
| Comparative Example 20 | 75.3 | 4 | 155.4 | 4.5 | 1258 |
| Comparative Example 21 | 76.1 | 4 | 154.3 | 4.7 | 1378 |
| Comparative Example 22 | 76.8 | 4 | 154.3 | 4.7 | 1328 |
| Comparative Example 23 | 75.4 | 4 | 153.9 | 3.3 | 1458 |
| Comparative Example 24 | 76.1 | 4 | 154.5 | 3.5 | 1327 |
| Comparative Example 25 | 72.1 | 2 | 152.1 | 2.7 | 1556 |
| Comparative Example 26 | 76.4 | 3 | 151.4 | 2.4 | 1645 |
| Comparative Example 27 | 76.3 | 3 | 152.1 | 2.5 | 1548 |
| Comparative Example 28 | 78.4 | 3 | 158.6 | 2.9 | 1538 |
| Comparative Example 29 | 56.4 | 8 | 152.3 | 4.8 | 1017 |
| Comparative Example 30 | 74.3 | 6 | 155.4 | 3.8 | 1126 |
| Comparative Example 31 | 54.7 | 9 | 154.9 | 6.4 | 986 |
| Comparative Example 32 | 68.4 | 7 | 155.6 | 4.5 | 1047 |

As can be seen from the comparison between Table 7 and Table 11, the electrolyte solution composition of the present application can further improve the energy density and cycling performance of the secondary battery.

It should be noted that the present application is not limited to the above embodiments. The above embodiments are merely illustrative, and embodiments having substantively the same composition as the technical idea and having the same effects within the scope of the technical solutions of the present application are all included in the technical scope of the present application. In addition, without departing from the scope of the subject matter of the present application, various modifications that can be conceived of by those skilled in the art are applied to the embodiments, and other embodiments constructed by combining some of the constituent elements of the embodiments are also included in the scope of the present application.

What is claimed is:

1. A secondary battery, comprising a positive electrode plate and a non-aqueous electrolyte solution, wherein
the positive electrode plate comprises a positive electrode active material having a core-shell structure and comprising an inner core and a shell cladding the inner core, wherein
the inner core has a chemical formula of $Li_{1+x}Mn_{1-y}A_yP_{1-z}R_zO_4$, wherein x is any value ranging from −0.100 to 0.100, y is any value ranging from 0.001 to 0.500, z is any value ranging from 0.001 to 0.100, the A is one or more elements selected from the group consisting of Zn, Al, Na, K, Mg, Mo, W, Ti, V, Zr, Fe, Ni, Co, Ga, Sn, Sb, Nb, and Ge; R is one or more elements selected from the group consisting of B, Si, N, and S;
the shell comprises a first cladding layer cladding the inner core, a second cladding layer cladding the first cladding layer, and a third cladding layer cladding the second cladding layer, wherein
the first cladding layer comprises crystalline pyrophosphates $Li_aMP_2O_7$ and/or $M_b(P_2O_7)_c$, wherein $0 \leq a \leq 2$, $1 \leq b \leq 4$, and $1 \leq c \leq 6$, values of the a, b, and c satisfy a condition of: keeping the crystalline pyrophosphate $Li_aMP_2O_7$ or $M_b(P_2O_7)_c$ electroneutral, and M in the crystalline pyrophosphates $Li_aMP_2O_7$ and $M_b(P_2O_7)_c$ is each independently one or more elements selected from the group consisting of Fe, Ni, Mg, Co, Cu, Zn, Ti, Ag, Zr, Nb, and Al,
the second cladding layer comprises a crystalline phosphate $XPO_4$, wherein the X is one or more elements selected from the group consisting of Li, Fe, Ni, Mg, Co, Cu, Zn, Ti, Ag, Zr, Nb, and Al, and
the third cladding layer is carbon; and
the non-aqueous electrolyte solution comprises a first additive comprising one or more compounds in the group consisting of a compound represented by formula 1, a compound represented by formula 2, and a compound represented by formula 3,

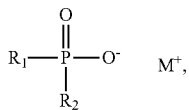

formula 1

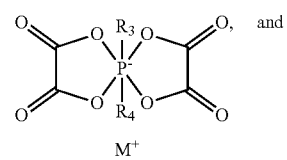

formula 2

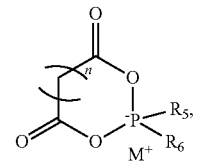

formula 3 wherein $R_1$ and $R_2$ each independently represent any one of F, C1-C6 fluoroalkyl, C1-C6 alkyl, C1-C6 alkoxy, C2-C6 alkenyl, C2-C6 alkynyl, or C6-C10 aryl, and at least one of $R_1$ or $R_2$ represents any one of F or C1-C6 fluoroalkyl, $R_3$ and $R_4$ each independently represent any one of F, C1-C6 fluoroalkyl, C1-C6 alkyl, C1-C6 alkoxy, C2-C6 alkenyl, or C2-C6 alkynyl, and at least one of $R_3$ or $R_4$ represents any one of F or C1-C6 fluoroalkyl, $R_5$ and $R_6$ each independently represent any one of F, C1-C6 fluoroalkyl, C1-C6 alkyl, C1-C6 alkoxy, C2-C6 alkenyl, C2-C6 alkynyl, carbonyl, —O, =O, —$BF_3^-$, or —$OBF_3^-$, M in each chemical formula each independently represents one or more of an alkali metal or an alkaline earth metal, and n is 0, 1, or 2.

2. The secondary battery according to claim 1, wherein $R_1$ and $R_2$ each independently represent any one of F, C1-C3 fluoroalkyl, C1-C3 alkyl, C1-C3 alkoxy, C2-C3 alkenyl, C2-C3 alkynyl, phenyl, benzyl, or methylphenyl, at least one of $R_1$ or $R_2$ represents any one of F or C1-C3 fluoroalkyl; and/or $R_3$ and $R_4$ each independently represent any one of F, C1-C3 fluoroalkyl, C1-C3 alkyl, C1-C3 alkoxy, C2-C3 alkenyl, or C2-C3 alkynyl, at least one of $R_3$ or $R_4$ represents any one of F or C1-C3 fluoroalkyl; and/or $R_5$ and $R_6$ each independently represent any one of F, C1-C3 fluoroalkyl, C1-C3 alkyl, C1-C3 alkoxy, C2-C6 alkenyl, C2-C6 alkynyl, carbonyl, —O, =O, —$BF_3^-$, or —$OBF_3^-$; and/or M in each chemical formula each independently represents one of Li, Na, or K.

3. The secondary battery according to claim 1, wherein the first additive comprises one or more compounds of:

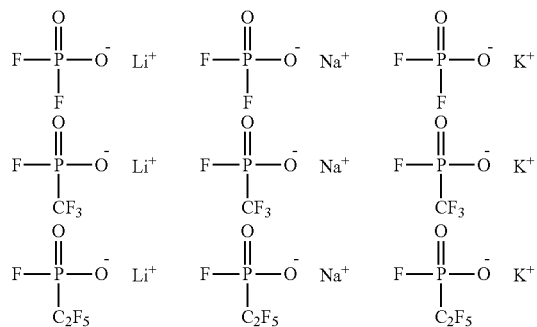

-continued

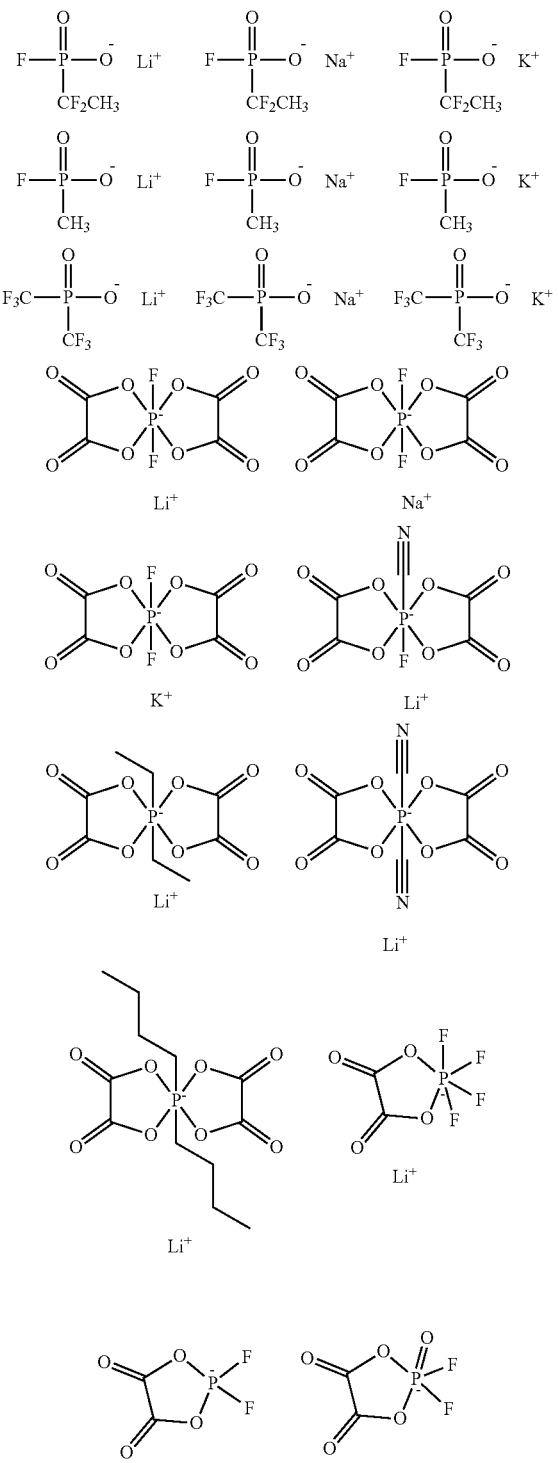

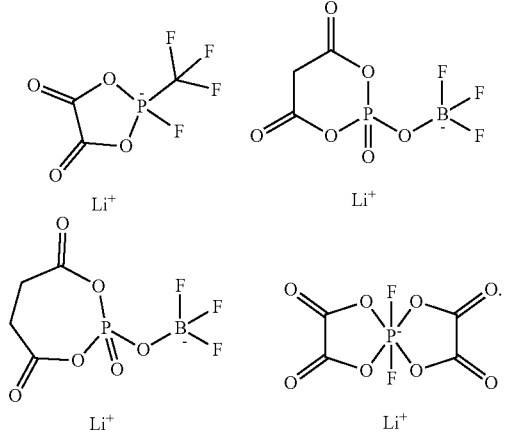

4. The secondary battery according to claim 1, wherein the first additive comprises any one or more compounds of:

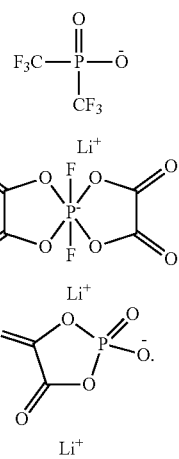

5. The secondary battery according to claim 1, wherein the non-aqueous electrolyte solution further comprises a second additive comprising one or more compounds in the group consisting of an unsaturated bond-containing cyclic carbonate compound, a halogen-substituted cyclic carbonate compound, a sulfate compound, a sulfite compound, a sultone compound, a disulfonic acid compound, a nitrile compound, an aromatic compound, an isocyanate compound, a phosphazene compound, a cyclic anhydride compound, a phosphite compound, a phosphate compound, or a borate compound.

6. The secondary battery according to claim 5, wherein based on a total weight of the non-aqueous electrolyte solution, a content of the first additive is W1 wt %, wherein W1 is from 0.005 to 20, and/or a content of the second additive is W2 wt %, wherein W2 is from 0.001 to 20.

7. The secondary battery according to claim 5, wherein based on a weight of the inner core, a cladding amount of the first cladding layer is C1 wt %, wherein C1 is greater than 0 and less than or equal to 6; and/or based on the weight of the inner core, a cladding amount of the second cladding layer is C2 wt %, wherein C2 is greater than 0 and less than or equal to 6; and/or based on the weight of the inner core, a cladding amount of the third cladding layer is C3 wt %, wherein C3 is greater than 0 and less than or equal to 6; and based on a total weight of the non-aqueous electrolyte solution, a content of the first additive is W1 wt %, a content of the second additive is W2 wt %: and a ratio (W1+W2)/(C1+C2+C3) is defined as Q, wherein Q is from 0.001 to 2.

8. The secondary battery according to claim 1, wherein the non-aqueous electrolyte solution further comprises an organic solvent and an electrolyte salt.

9. The secondary battery according to claim 1, wherein based on a weight of the inner core, a cladding amount of the first cladding layer is C1 wt %, wherein C1 is greater than 0 and less than or equal to 6; and/or based on the weight of the inner core, a cladding amount of the second cladding layer is C2 wt %, wherein C2 is greater than 0 and less than or equal to 6; and/or based on the weight of the inner core, a cladding amount of the third cladding layer is C3 wt %, wherein C3 is greater than 0 and less than or equal to 6.

10. The secondary battery according to claim 1, wherein an interplanar spacing of the crystalline pyrophosphate in the first cladding layer ranges from 0.293 to 0.470 nm, and an angle in a crystallographic direction (111) ranges from 18.00° to 32.00°; and an interplanar spacing of the crystalline pyrophosphate in the second cladding layer ranges from 0.244 to 0.425 nm, and an angle in the crystallographic direction (111) ranges from 20.00° to 37.00°.

11. The secondary battery according to claim 1, wherein in the inner core, a ratio of y to 1−y is from 1:10 to 1:1; and/or in the inner core, a ratio of z to 1−z is from 1:9 to 1:999.

12. The secondary battery according to claim 1, wherein carbon of the third cladding layer is a mixture of SP2 hybridized carbon and SP3 hybridized carbon.

13. The secondary battery according to claim 1, wherein a thickness of the first cladding layer is from 1 to 10 nm; and/or a thickness of the second cladding layer is from 2 to 15 nm; and/or a thickness of the third cladding layer is from 2 to 25 nm.

14. The secondary battery according to claim 1, wherein based on a weight of the positive electrode active material, a content of element manganese ranges from 10 wt % to 35 wt %; and a content of element phosphorus ranges from 12 wt % to 25 wt %.

15. The secondary battery according to claim 1, wherein a lattice change rate of the positive electrode active material having the core-shell structure is 4% or less.

16. The secondary battery according to claim 1, wherein an antisite defect concentration of Li/Mn of the positive electrode active material having the core-shell structure is 4% or less, is optionally 2.2% or less, and is more optionally from 1.5 to 2.2%.

17. The secondary battery according to claim 1, wherein a compaction density of the positive electrode active material having the core-shell structure under 3T is 2.2 $g/cm^3$ or more.

18. The secondary battery according to claim 1, wherein a surface oxygen valence state of the positive electrode active material having a core-shell structure is −1.90 or less.

19. A battery module, comprising the secondary battery according to claim 1.

20. A battery pack, comprising the battery module according to claim 19.

21. An electrical apparatus, comprising the secondary battery according to claim 1.

\* \* \* \* \*